United States Patent
Yang et al.

(10) Patent No.: US 11,962,998 B2
(45) Date of Patent: Apr. 16, 2024

(54) METHOD AND DEVICE FOR ACCESSING A NETWORK

(71) Applicant: HUAWEI TECHNOLOGIES CO., LTD., Shenzhen (CN)

(72) Inventors: Yanmei Yang, Beijing (CN); Jiangwei Ying, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 534 days.

(21) Appl. No.: 17/192,156

(22) Filed: Mar. 4, 2021

(65) Prior Publication Data
US 2021/0195408 A1    Jun. 24, 2021

Related U.S. Application Data

(63) Continuation of application No. PCT/CN2019/104275, filed on Sep. 4, 2019.

(30) Foreign Application Priority Data

Sep. 5, 2018    (CN) .......................... 201811033107.0

(51) Int. Cl.
   *H04W 12/06*    (2021.01)
   *H04L 9/40*     (2022.01)
   *H04W 8/08*     (2009.01)
   (Continued)

(52) U.S. Cl.
   CPC .............. *H04W 12/02* (2013.01); *H04W 8/08* (2013.01); *H04W 8/20* (2013.01); *H04W 12/06* (2013.01); *H04W 48/14* (2013.01)

(58) Field of Classification Search
   CPC ....... H04W 12/02; H04W 12/06; H04W 8/08; H04W 8/20; H04W 48/14; H04W 48/18;
   (Continued)

(56) References Cited

U.S. PATENT DOCUMENTS

| 2014/0195641 A1* | 7/2014 | Wang ...................... H04L 67/63 709/217 |
| 2018/0227873 A1 | 8/2018 | Vrzic et al. |
| 2020/0404551 A1* | 12/2020 | Wang .................... H04L 67/141 |

(Continued)

FOREIGN PATENT DOCUMENTS

| CN | 107105458 A | 8/2017 |
| CN | 108024296 A | 5/2018 |

(Continued)

OTHER PUBLICATIONS

Guti Reallocation Demystified: Cellular Location Tracking with Changing Temporary Identifier, by Kim et al., published 2018 (Year: 2018).*

(Continued)

*Primary Examiner* — Vu V Tran
(74) *Attorney, Agent, or Firm* — Rimon PC

(57) ABSTRACT

This application relates to the field of wireless communications technologies, and provides a communication method, including: receiving, by a mobility management network element, first information from a terminal device; obtaining a user equipment context of the terminal device in a public network and a user equipment context of the terminal device in a private network based on the first information; and using the user equipment context of the terminal device in the public network and the user equipment context of the terminal device in the private network as a user equipment context of the terminal device. According to the solution provided in embodiments, the user equipment context of the terminal device includes the user equipment context in the public network and the user equipment context in the private network, so that the terminal device can access both the public network and the private network, thereby improving user experience.

20 Claims, 5 Drawing Sheets

(51) Int. Cl.
*H04W 8/20* (2009.01)
*H04W 12/02* (2009.01)
*H04W 36/00* (2009.01)
*H04W 48/14* (2009.01)
*H04W 48/18* (2009.01)
*H04W 60/00* (2009.01)
*H04W 88/06* (2009.01)

(58) Field of Classification Search
CPC ............... H04W 60/00; H04W 88/06; H04W 36/0033; H04L 63/0272
See application file for complete search history.

(56) References Cited

U.S. PATENT DOCUMENTS

2021/0007027 A1* 1/2021 Yang ..................... H04W 60/00
2021/0329583 A1* 10/2021 Baek ..................... H04W 48/18

FOREIGN PATENT DOCUMENTS

| | | |
|---|---|---|
| CN | 108323245 A | 7/2018 |
| EP | 2978189 A1 | 1/2016 |
| WO | 2018137866 A1 | 8/2018 |

OTHER PUBLICATIONS

ZTE, TS 23.502 Update on Registration procedure, S2-176075, SA WG2 Meeting #122bis, Aug. 21-25, 2017, 8 pages.

ZTE, Discussion on Support EAP a method of authentication and authorization with external networks over 3GPP and trusted non-3GPP, C3-111448, 3GPP TSG CT WG1 Meeting #73, , St Julians, Malta, Aug. 22-26, 2011, 3 pages.

Huawei, HiSilicon, Supporting the Non-Public Network as a set of slices, S2-1812355, SA WG2 Meeting #129bis, Nov. 26-Nov. 30, 2018, West Palm Beach, Florida, the US, 6 pages.

* cited by examiner

METHOD AND DEVICE FOR ACCESSING A NETWORK

CROSS-REFERENCE TO RELATED APPLICATIONS

This application is a continuation of International Patent Application No. PCT/CN2019/104275, filed on Sep. 4, 2019, which claims priority to Chinese Patent Application No. 201811033107.0, filed on Sep. 5, 2018. The disclosures of the aforementioned applications are hereby incorporated by reference in their entireties.

TECHNICAL FIELD

The present invention relates to the field of communications technologies, and in particular, to a communication method and an apparatus.

BACKGROUND

In an application scenario of 5th generation (the 5th-Generation, 5G) communication, a vertical industry is a very important field, for example, an internet of things (Internet of Things, IoT), machine to machine (Machine to Machine, M2M), and Industry 4.0 (Industry 4.0). In these fields, there are a large quantity of (private) enterprises. These enterprises all put forward a requirement of using an enterprise private network to directly manage and control terminal devices of the enterprises, without depending on an operator network.

At the current stage, for the enterprise private network, a network slicing technology can be used to deploy a virtual dedicated network for an enterprise. In the network slicing technology, network environments isolated from each other are provided for different application scenarios by virtualizing an independent logical network on a same network infrastructure, so that network functions and features can be customized for the different application scenarios based on respective requirements, to ensure requirements of different services.

In an existing 5G communications technology, both access of a terminal device to an enterprise network slice for a private network and access of the terminal device to an operator network slice for a public network are managed and controlled by an operator public network. Consequently, a subscription management requirement of the enterprise private network for the terminal device cannot be met, for example, registration and deregistration of the terminal device, and update of user subscription information. In addition, an existing network architecture cannot meet security and privacy requirements of the enterprise private network, for example, an identifier of the terminal device, subscription information, a policy, and communication data security.

Therefore, implementing security and privacy management and control of the enterprise private network on an enterprise user becomes an urgent problem to be resolved currently.

SUMMARY

Embodiments of the present invention provide a communication method and an apparatus.

According to a first aspect, an embodiment of this application provides a communication method. The method includes:

A mobility management network element (for example, an AMF network element) receives first information from a terminal device (for example, UE). The mobility management network element obtains a user equipment context of the terminal device in a public network and a user equipment context of the terminal device in a private network based on the first information. The mobility management network element uses the user equipment context of the terminal device in the public network and the user equipment context of the terminal device in the private network as a user equipment context of the terminal device.

According to the foregoing method, the terminal device may be registered in both the public network and the private network, so that a network obtains the user equipment context of the terminal device in the public network and the user equipment context of the terminal device in the private network, to implement access of the terminal device to the public network and the private network, and improve user experience. After the terminal device is registered in the private network, the private network can manage and control security and privacy data of the terminal device, so that the enterprise private network can independently manage enterprise user data.

In a possible design, the first information includes a GUTI of the terminal device and private-network information, the private-network information includes one or more of the following information: a SUPI of the terminal device in the private network, type information of the private network, and indication information of the private network, and the indication information of the private network is used to indicate a network slice, for the private network, that the terminal device requests to access. The type information of the private network is used to indicate that a type of a network that the terminal device requests to access is the private network. For example, the type information of the private network may be the network slice for the private network. Alternatively, the first information includes a GUTI of the terminal device and public-network information, the public-network information includes one or more of the following information: a SUPI of the terminal device in the public network, type information of the public network, and indication information of the public network, and the indication information of the public network is used to indicate a network slice, for the public network, that the terminal device requests to access. The type information of the public network is used to indicate that a type of a network that the terminal device requests to access is the public network. For example, the type information of the public network may be the network slice for the public network. Alternatively, the first information includes a SUPI of the terminal device in the public network and/or a SUPI of the terminal device in the private network. Therefore, when the terminal device has been registered in the public network, the terminal device may initiate registration in the private network by using the first information. Alternatively, when the terminal device has been registered in the private network, the terminal device may initiate registration in the public network by using the first information. Alternatively, when the terminal device is registered in neither the public network nor the private network, the terminal device may initiate initial registration in both the public network and the private network by using the first information. In the foregoing three scenarios, access of the terminal device to the public network and the private network can be implemented, to improve user experience.

In a possible design, when the first information includes the SUPI of the terminal device in the public network and/or the SUPI of the terminal device in the private network, the first information further includes one or more of the following information: the type information of the public network, the indication information of the public network, the type information of the private network, and the indication information of the private network.

In a possible design, the mobility management network element sends request information to a data management network element (for example, a UDM network element) of the private network based on the first information. The mobility management network element receives subscription data of the terminal device in the private network from the data management network element of the private network. The mobility management network element creates the user equipment context of the terminal device in the private network based on the subscription data in the private network. Therefore, the terminal device may be registered in the private network, and the private network can manage and control the security and privacy data of the terminal device, so that the enterprise private network can independently manage the enterprise user data.

In a possible design, the first information includes the SUPI of the terminal device in the private network, and the mobility management network element obtains the data management network element of the private network based on the SUPI of the terminal device in the private network and a first correspondence between the SUPI of the terminal device in the private network and the data management network element of the private network. Therefore, when the terminal device initiates registration in the private network, the mobility management network element may obtain the data management network element of the private network based on the first information and the first correspondence.

In a possible design, the first information includes the SUPI of the terminal device in the private network, and the mobility management network element obtains the data management network element of the private network from a network slice selection function network element (for example, an NSSF network element), a network database in the public network, or a network repository function network element (for example, an NRF network element) of the public network based on the SUPI of the terminal device in the private network.

In a possible design, the first information includes the indication information of the private network, and the mobility management network element obtains the data management network element of the private network based on the indication information of the private network and a second correspondence between the indication information of the private network and the data management network element of the private network. Therefore, when the terminal device initiates registration in the private network, the mobility management network element may obtain the data management network element of the private network based on the first information and the second correspondence.

In a possible design, the first information includes the indication information of the private network, and the mobility management network element obtains the data management network element of the private network from a network slice selection function network element, a network database in the public network, or a network repository function network element of the public network based on the indication information of the private network.

In a possible design, before that the mobility management network element sends request information to a data management network element of the private network based on the first information, the mobility management network element obtains an authentication service network element (for example, an AUSF network element) of the private network based on the first information.

In a possible design, the mobility management network element sends authentication indication information to the authentication service network element of the private network, where the authentication indication information is used to indicate the authentication service network element of the private network to perform EAP-AKA authentication on the terminal device. Therefore, when the terminal device is registered in the private network, the private network performs security authentication on the terminal device, so that the enterprise private network implements security management on the enterprise user data.

According to a second aspect, this application further discloses a communication method. The method includes: A mobility management network element receives a SUPI of a terminal device in a first network and first information from the terminal device, where the first information is one or more of type information of the first network and indication information of the first network, and the indication information of the first network is used to indicate a network slice, for the first network, that the terminal device requests to access. The mobility management network element obtains a user equipment context of the terminal device in the first network based on the SUPI of the terminal device and the first information.

According to the foregoing method, when the terminal device is not registered in the first network, the terminal device may initiate initial registration in the first network by using the SUPI of the terminal device in the first network and the first information, so that the terminal device accesses the first network.

In a possible design, the mobility management network element sends request information to a data management network element of the first network based on the SUPI of the terminal device in the first network and the first information. The mobility management network element receives subscription data of the terminal device in the first network from the data management network element of the first network. The mobility management network element creates the user equipment context in the first network based on the subscription data in the first network.

In a possible design, the mobility management network element selects the data management network element of the first network based on the SUPI of the terminal device in the first network and a first correspondence between the SUPI of the terminal device in the first network and the data management network element of the first network. Therefore, when the terminal device initiates registration in the first network, the mobility management network element may select the data management network element of the first network based on the SUPI of the terminal device in the first network and the first correspondence.

In a possible design, the first information includes a SUPI of the terminal device in a private network, and the mobility management network element obtains the data management network element of the private network from a network slice selection function network element, a network database in a public network, or a network repository function network element of the public network based on the SUPI of the terminal device in the private network.

In a possible design, when the first information includes the indication information of the first network, the mobility management network element selects the data management network element of the first network based on the indication information of the first network and a second correspondence between the indication information of the first network and the data management network element of the first network. Therefore, when the terminal device initiates registration in the first network, the mobility management network element may select the data management network element of the first network based on the indication information of the first network and the second correspondence.

In a possible design, when the first information includes the indication information of the first network, the mobility management network element obtains the data management network element of the private network from a network slice selection function network element, a network database in a public network, or a network repository function network element of the public network based on the indication information of the private network.

In a possible design, before that the mobility management network element sends request information to a data management network element of the first network based on the SUPI of the terminal device in the first network and the first information, the mobility management network element selects an authentication service network element of the first network based on the SUPI of the terminal device in the first network and the first information.

In a possible design, the mobility management network element sends an authentication request to the authentication service network element of the first network. Therefore, when the terminal device is registered in the first network, the first network performs security authentication on the terminal device, so that the first network implements security management on data of the terminal device.

According to a third aspect, this application further discloses a communication method. The method includes: A terminal device sends first information to a mobility management network element. The terminal device receives a registration acceptance message from the mobility management network element. The terminal device obtains a user equipment context of the terminal device in a public network and a user equipment context of the terminal device in a private network based on the registration acceptance message. The terminal device uses the user equipment context of the terminal device in the public network and the user equipment context of the terminal device in the private network as a user equipment context.

According to the foregoing method, when the terminal device is registered in neither the public network nor the private network, the terminal device may initiate initial registration in both the public network and the private network by using the first information, so that a network obtains the user equipment context of the terminal device in the public network and the user equipment context of the terminal device in the private network, to implement access of the terminal device to the public network and the private network, and improve user experience. After the terminal device is registered in the private network, the private network can manage and control security and privacy data of the terminal device, so that the enterprise private network can independently manage enterprise user data.

In a possible design, the first information includes a SUPI of the terminal device in the public network and/or a SUPI of the terminal device in the private network.

In a possible design, the first information further includes one or more of the following information: type information of the public network, indication information of the public network, type information of the private network, and indication information of the private network, the indication information of the public network is used to indicate a network slice, for the public network, that the terminal device requests to access, and the indication information of the private network is used to indicate a network slice, for the private network, that the terminal device requests to access.

According to a fourth aspect, this application further discloses a communication method. The method includes: A terminal device has a user equipment context of the terminal device in a first network. The terminal device sends first information to a mobility management network element. The terminal device receives a registration acceptance message from the mobility management network element. The terminal device obtains a user equipment context of the terminal device in a second network based on the registration acceptance message. The terminal device uses the user equipment context of the terminal device in the first network and the user equipment context of the terminal device in the second network as a user equipment context of the terminal device.

According to the foregoing method, when the terminal device has been registered in the public network, the terminal device may initiate registration in the private network by using the first information; or when the terminal device has been registered in the private network, the terminal device may initiate registration in the public network by using the first information. In the foregoing two scenarios, access of the terminal device to the public network and the private network can be implemented, to improve user experience.

In a possible design, the first information includes a GUTI of the terminal device and second network information, the second network information includes one or more of the following information: a SUPI of the terminal device in the second network, type information of the second network, and indication information of the second network, and the indication information of the second network is used to indicate a network slice, for the second network, that the terminal device requests to access.

According to a fifth aspect, this application further discloses a communication method. The method includes: A terminal device sends a SUPI of the terminal device in a first network and first information to a mobility management network element, where the first information is one or more of type information of the first network and indication information of the first network, and the indication information of the first network is used to indicate a network slice, for the first network, that the terminal device requests to access. The terminal device receives a registration acceptance message from the mobility management network element. The terminal device obtains a user equipment context of the terminal device in the first network based on the registration acceptance message.

According to the foregoing method, when the terminal device is not registered in the first network, the terminal device may initiate initial registration in the first network by using the SUPI of the terminal device in the first network and the first information, so that the terminal device accesses the first network.

According to a sixth aspect, an embodiment of this application provides a communications apparatus. The apparatus has a function of implementing behavior of the mobility management network element in the foregoing methods. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to enable the apparatus to perform a corresponding function in the foregoing methods. The transceiver is configured to implement communication between the apparatus and a terminal device/a data management network element of a private network/a network slice selection function network element/a network database in a public network/a network repository function network element of the public network/ an authentication service network element of the private network. The apparatus may further include a memory. The memory is configured to be coupled to the processor, and stores a program instruction and data that are necessary for the apparatus.

According to a seventh aspect, an embodiment of this application provides a communications apparatus. The apparatus has a function of implementing behavior of the mobility management network element in the foregoing methods. The function may be implemented by hardware, or may be implemented by hardware executing corresponding software. The hardware or the software includes one or more modules corresponding to the foregoing function. In a possible design, a structure of the apparatus includes a processor and a transceiver. The processor is configured to enable the apparatus to perform a corresponding function in the foregoing methods. The transceiver is configured to implement communication between the apparatus and a terminal device/a data management network element of a private network/a data management network element of a public network/a network slice selection function network element/a network database in the public network/a network repository function network element of the public network/ an authentication service network element of the private network/an authentication service network element of the public network. The apparatus may further include a memory. The memory is configured to be coupled to the processor, and stores a program instruction and data that are necessary for the apparatus.

According to eighth aspect, an embodiment of this application provides a terminal device. The terminal device has a function of implementing behavior of the terminal device in the foregoing methods. The function may be implemented by hardware, or may be implemented by hardware executing corresponding software. The hardware or the software includes one or more modules corresponding to the foregoing function. In a possible design, a structure of the terminal device includes a processor and a transceiver. The processor is configured to enable the terminal device to perform a corresponding function in the foregoing methods. The transceiver is configured to implement communication between the terminal device and a mobility management network element. The terminal device may further include a memory. The memory is configured to be coupled to the processor, and stores a program instruction and data that are necessary for the terminal device.

According to another aspect, an embodiment of this application provides a computer-readable storage medium. The computer-readable storage medium stores an instruction. When the instruction is run on a computer, the computer is enabled to perform the methods in the foregoing aspects.

According to another aspect, an embodiment of this application provides a computer program product including an instruction. When the computer program product runs on a computer, the computer is enabled to perform the methods in the foregoing aspects.

According to another aspect, this application provides a chip system. The chip system includes a processor, configured to support the foregoing apparatus or user equipment in implementing a function in the foregoing aspects, for example, generating or processing information in the foregoing methods. In a possible design, the chip system further includes a memory, and the memory is configured to store a program instruction and data that are necessary for a data sending device. The chip system may include a chip, or may include a chip and another discrete component.

BRIEF DESCRIPTION OF DRAWINGS

To describe the technical solutions in embodiments of the present invention more clearly, the following illustrates the accompanying drawings used in the embodiments of the present invention.

DESCRIPTION OF EMBODIMENTS

The following clearly describes the technical solutions in embodiments of this application with reference to the accompanying drawings in the embodiments of this application. In descriptions of this application, "/" means "or" unless otherwise specified. For example, AB may indicate A or B. In this application, "and/or" describes only an association relationship between associated objects and indicates that three relationships may exist. For example, A and/or B may indicate the following three cases: Only A exists, both A and B exist, and only B exists. In addition, in the descriptions of this application, "at least one item" means one or more items, and "a plurality of items" means two or more items. "At least one item (piece) of the following" or a similar expression thereof means any combination of these items, including a singular item (piece) or any combination of plural items (pieces). For example, at least one item (piece) of a, b, or c may indicate a, b, c, a and b, a and c, b and c, or a, b, and c, where a, b, and c may be singular or plural.

Figure 1:
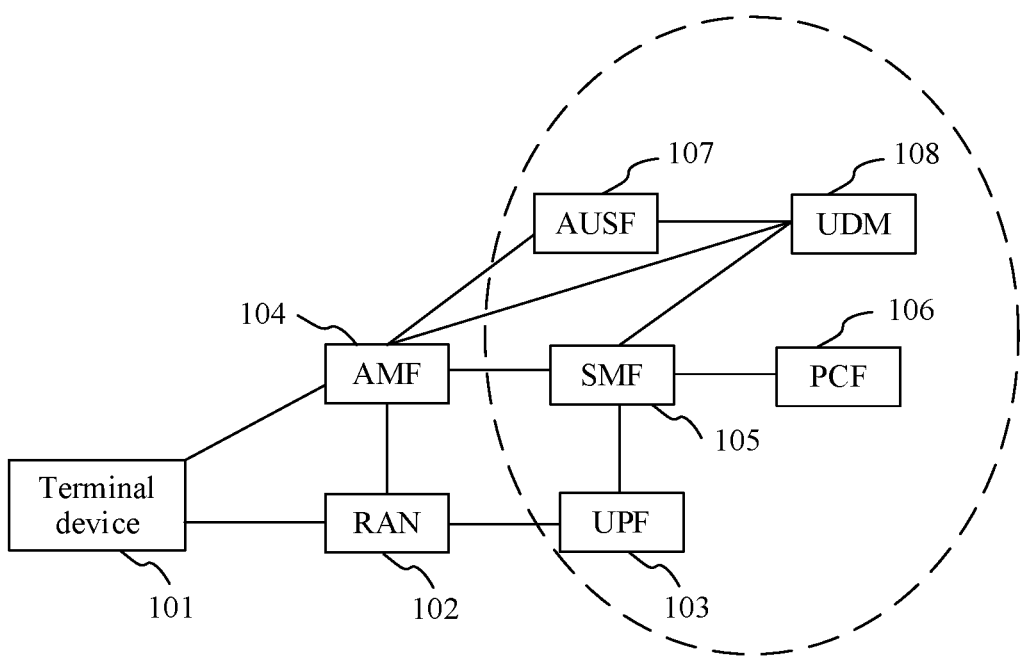
FIG. 1 is a schematic diagram of a 5G communications system according to an embodiment of this application.

FIG. 1 is a schematic diagram of a 5G communications system according to an embodiment of this application. In a 5G mobile network architecture, a control plane function of a mobile gateway is decoupled from a forwarding plane function of the mobile gateway, and the separated control plane function of the mobile gateway, a conventional 3rd generation partnership project (third generation partnership project, 3GPP) control network element mobility management entity (mobility management entity, MME), and the like are combined to form a unified control plane (control plane). A user plane function (User plane function, UPF) network element can implement user plane functions (SGW-U and PGW-U) of a serving gateway (serving gateway, SGW) and a packet data network gateway (packet data network gateway, PGW). Further, a unified control plane network element may be decomposed into an access and mobility management function (access and mobility management function, AMF) network element and a session management function (session management function, SMF) network element.

As shown in FIG. 1, the communications system includes at least a terminal device 101, an AMF network element 104, an authentication server function (authentication server function, AUSF) network element 107, and a unified data management (unified data management, UDM) network element 108.

The terminal device 101 in this system is not limited to a 5G network, and includes a mobile phone, an internet of things device, a smart household device, an industrial control device, a vehicle device, and the like. The terminal device may also be referred to as user equipment (User Equipment, UE), a mobile station (Mobile Station), a mobile station (Mobile), a remote station (Remote Station), a remote terminal (Remote Terminal), an access terminal (Access Terminal), or a user agent (User Agent). This is not limited herein. The terminal device may alternatively be a vehicle in vehicle-to-vehicle (Vehicle-to-vehicle, V2V) communication, a machine in machine type communication, or the like.

The AMF network element 104 in this system may be responsible for registration, mobility management, a tracking area update procedure, and the like of the terminal device. The AMF network element may also be referred to as an AMF device or an AMF entity.

The AUSF network element 107 in this system can provide authentication control for the user equipment.

The UDM network element 108 in this system can store subscription data of a user. For example, the subscription data of the user includes subscription data related to mobility management and subscription data related to session management. The UDM network element may also be referred to as a UDM device or a UDM entity.

Optionally, the 5G communications system further includes a radio access network (radio access network, RAN) device 102. The RAN device 102 is an apparatus configured to provide a wireless communication function for the terminal device 101. The RAN device 102 may include base stations in various forms, such as a macro base station, a micro base station (also referred to as a small cell), a relay station, and an access point. In systems that use different radio access technologies, names of a device that has a base station function may be different. For example, in an LTE system, the device is referred to as an evolved NodeB (evolved NodeB, eNB or eNodeB). In a 3rd generation (3rd generation, 3G) system, the device is referred to as a NodeB (NodeB). In a new generation system, the device is referred to as a gNB (gNodeB).

Optionally, the 5G communications system further includes a UPF network element 103, where the UPF network element 103 may implement functions such as forwarding, counting, and detection of a packet of the user. The UPF network element may also be referred to as a UPF device or a UPF entity.

Optionally, the 5G communications system further includes an SMF network element 105, where the SMF network element 105 may be responsible for session management of the terminal device. For example, the session management includes selection of a user plane device, reselection of a user plane device, IP address allocation, quality of service (quality of service, QoS) control, session establishment, modification, or release, and the like.

Optionally, the 5G communications system further includes a policy control function (policy control function, PCF) network element 106. The network element includes a policy control function and a flow-based charging control function. For example, the PCF network element 106 may implement a user subscription data management function, a policy control function, a charging policy control function, and QoS control. The PCF network element may also be referred to as a PCF entity or a PCF device.

For a network slice architecture in the prior art, the UPF network element 103 and the SMF network element 105 are network elements unique to each network slice, and the AMF network element 104, the PCF network element 106, the AUSF network element 107, and the UDM network element 108 are network elements shared by a plurality of network slices. Therefore, in the existing architecture, security and privacy information (for example, an identity, subscription information, a policy, and communication data security of the user) of the terminal device in the AUSF network element 107 and the UDM network element 108 is still controlled and managed by an operator public network. Therefore, the existing network architecture cannot meet security and privacy requirements of an enterprise private network. However, in the 5G communications system provided in this embodiment of this application, a network slice for a private network of an enterprise is shown in a dashed-line box in FIG. 1. The network slice for the private network has the independent UPF network element 103, the independent SMF network element 105, the independent PCF network element 106, the independent AUSF network element 107, and the independent UDM network element 108, so that the security and privacy information of the terminal device can be controlled and managed by the enterprise, and subscription management and user authentication of the enterprise on the terminal device can be implemented.

The foregoing network elements may be network elements implemented on dedicated hardware, or may be software instances run on dedicated hardware, or may be instances of virtualization functions on a proper platform. For example, the foregoing virtualization platform may be a cloud platform.

In addition, this embodiment of this application is also applicable to other future-oriented communications technologies. The network architecture and the service scenario described in this application are intended to describe the technical solutions in this application more clearly, and do not constitute a limitation on the technical solutions provided in this application. A person of ordinary skill in the art may know that with evolution of the network architecture and emergence of new service scenarios, the technical solutions provided in this application are also applicable to a similar technical problem.

The following uses the 5G communications system shown in FIG. 1 as an example to describe the technical solutions in this application in detail by using some embodiments. The following several embodiments may be combined with each other, and a same or similar concept or process may not be described repeatedly in some embodiments.

It should be noted that, in the following embodiments, an enterprise private network may be understood as a private network, and an operator public network may be understood as a public network.

Figure 2A:
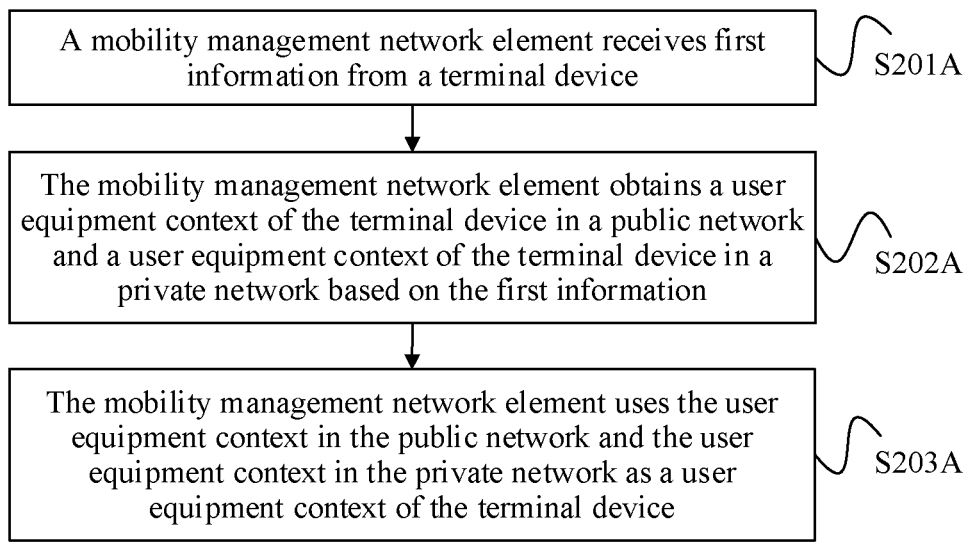
FIG. 2A is a flowchart of a communication method according to an embodiment of this application.

FIG. 2A is a flowchart of a communication method according to an embodiment of this application. The method is applicable to the communications system shown in FIG. 1. According to the method, in the 5G communications system shown in FIG. 1, a terminal device may be registered in both a public network and a private network, so that a network obtains a user equipment context of the terminal device in the public network and a user equipment context of the terminal device in the private network. The method may include the following steps.

S201A: A mobility management network element receives first information from the terminal device.

For example, the mobility management network element is the AMF network element 104 in FIG. 1, and the terminal device is the terminal device 101 in FIG. 1.

For example, the first information includes a globally unique temporary identity (global unique temporary identity, GUTI) of the terminal device and private-network information. For example, the private-network information includes any one or more of the following information: a subscription permanent identifier (subscription permanent identifier, SUPI) of the terminal device in the private network, type information of the private network, and indication information of the private network. For example, the indication information of the private network is used to indicate a network slice, for the private network, that the terminal device requests to access. Alternatively, the first information includes a GUTI of the terminal device and public-network information, and the public-network information includes one or more of the following information: a SUPI of the terminal device in the public network, type information of the public network, and indication information of the public network. For example, the indication information of the public network is used to indicate a network slice, for the public network, that the terminal device requests to access. Alternatively, the first information includes a SUPI of the terminal device in the public network and/or a SUPI of the terminal device in the private network.

In the following three different application scenarios, the first information may include any one of the following plurality of manners.

Scenario 1: The terminal device has been successfully registered in the public network and then is registered in the private network.

For example, the first information in the scenario 1 is shown in Table 1, and the first information may include any one of the following six manners:

In a first possible manner, the first information includes the GUTI of the terminal device and the private-network information, and the private-network information includes one or more of the following information: the SUPI in the private network, the type information of the private network, and the indication information of the private network. For example, the indication information of the private network is used to indicate the network slice, for the private network, that the terminal device requests to access. The type information of the private network is used to indicate that a type of a network that the terminal device requests to access is the private network. For example, the type information of the private network may be the network slice for the private network.

In any embodiment of this application, the SUPI may be a subscription concealed identifier (Subscription Concealed Identifier, SUCI). The indication information of the private network may be single network slice selection assistance information (Single Network Slice Selection Assistance Information, S-NSSAI), and may be used to select a corresponding network slice. Different network slices may support different network features and network functions. For example, the S-NSSAI includes a slice/service type (Slice/Service type, SST) and a slice differentiator (Slice Differentiator, SD), for example, the SST and/or the SD are/is used to indicate the private network. The type information of the private network is used to indicate that the type of the network that the terminal device requests to access is the private network. The GUTI is an identity that is allocated by a core network and that uniquely identifies the terminal device in a network.

In this possible manner, the SUPI in the public network is the same as the SUPI in the private network, and the SUPI in the private network may be used to indicate the network slice, for the private network, that the terminal device requests to access. For example, the SUPI in the private network includes a mobile country code (mobile country code, MCC), a private network code (private network code, PNC), and an MSIN (Mobile Subscriber Identification Number, mobile subscriber identification number). For example, the PNC may be used to indicate the network slice for the private network. For example, when the private-network information includes the SUPI, the mobility management network element may determine, based on both the GUTI and the SUPI that are carried in the first message, that the UE requests to be registered in the private network, and learn of, based on the SUPI, the network slice, for the private network, that the terminal device requests to access, so that the terminal device initiates registration in the private network.

In the first possible manner, when registered in the public network, the terminal device needs to send only the SUPI (initially registered in the public network) in the public network or the GUTI (re-registered in the public network) to the mobility management network element, and when registered in the private network, the terminal device needs to send the GUTI and the private-network information to the mobility management network element. Therefore, the mobility management network element may determine, based on the GUTI and the private-network information, that the terminal device is registered in the private network. For example, because the terminal device has been successfully registered in the public network, the core network has allocated the GUTI to the terminal device. In addition, because the terminal device has been successfully registered in the public network, the mobility management network element has obtained the SUPI in the public network. Further, because the SUPI in the public network is the same as the SUPI in the private network, even when the private-network information does not include the SUPI, the mobility management network element can also obtain the SUPI in the private network, and learn of, based on the SUPI in the private network, the network slice, for the private network, that the terminal device requests to access, to implement registration in the private network.

In a second possible manner, for content of the first information, refer to the description of the content of the first information in the first possible manner. Details are not described herein again. In the second possible manner, the SUPI in the public network is the same as the SUPI in the private network. A difference from the first possible manner is that the SUPI in the private network cannot be used to indicate the network slice, for the private network, that the terminal device requests to access. For example, a structure of the SUPI in the private network is the same as that of a SUPI in an existing public network, including an MCC, a mobile network code (mobile network code, MNC), and an MSIN. For example, the MNC is used to indicate the public network.

In the second possible manner, when registered in the public network, the terminal device needs to send only the SUPI (initially registered in the public network) in the public network or the GUTI (re-registered in the public network) to the mobility management network element, and when registered in the private network, the terminal device needs to send the GUTI and the private-network information to the mobility management network element. Therefore, the mobility management network element may determine, based on the GUTI and the private-network information, that the terminal device is registered in the private network. For example, because the terminal device has been successfully registered in the public network, the core network has allocated the GUTI to the terminal device. In addition, because the terminal device has been successfully registered in the public network, the mobility management network element has obtained the SUPI in the public network. Further, because the SUPI in the public network is the same as the SUPI in the private network, the mobility management network element can obtain the SUPI in the private network. Because the SUPI in the private network cannot be used to indicate the network slice, for the private network, that the terminal device requests to access, the mobility management network element needs to determine, based on a correspondence between the network slice for the private network and the SUPI in the private network, the network slice, for the private network, that the terminal device requests to access, to implement registration in the private network. For example, the correspondence between the network slice for the private network and the SUPI in the private network is stored in the mobility management network element. Further, optionally, the mobility management network element may obtain the correspondence between the network slice for the private network and the SUPI in the private network from a UDM network element.

In a third possible manner, the first information includes the GUTI of the terminal device and the private-network information, and the private-network information includes the indication information of the private network. For example, the indication information of the private network is used to indicate the network slice, for the private network, that the terminal device requests to access. In this possible manner, the SUPI in the public network is the same as the SUPI in the private network, and the SUPI in the private network cannot be used to indicate the network slice, for the private network, that the terminal device requests to access. For example, for the SUPI in the private network in this manner, refer to the description of the SUPI in the private network in the second possible manner. Details are not described herein again.

In the third possible manner, when registered in the public network, the terminal device needs to send only the SUPI (initially registered in the public network) in the public network or the GUTI (re-registered in the public network) to the mobility management network element, and when registered in the private network, the terminal device needs to send the GUTI and the indication information of the private network to the mobility management network element. Therefore, the mobility management network element may determine, based on the GUTI and the indication information of the private network, that the terminal device is registered in the private network. For example, because the terminal device has been successfully registered in the public network, the core network has allocated the GUTI to the terminal device. In addition, because the terminal device has been successfully registered in the public network, the mobility management network element has obtained the SUPI in the public network. Further, because the SUPI in the public network is the same as the SUPI in the private network, the mobility management network element can obtain the SUPI in the private network. Because the SUPI in the private network cannot be used to indicate the network slice, for the private network, that the terminal device requests to access, the mobility management network element may learn of, based on the indication information of the private network, the network slice, for the private network, that the terminal device requests to access, to implement registration in the private network.

Optionally, in the third possible manner, the first information further includes one or more of the type information of the private network and the SUPI in the private network.

In a fourth possible manner, the first information includes the GUTI of the terminal device and the private-network information, and the private-network information includes the SUPI in the private network. In this possible manner, the SUPI in the public network is different from the SUPI in the private network, and the SUPI in the private network may be used to indicate the network slice, for the private network, that the terminal device requests to access. For example, for the SUPI in the private network in this manner, refer to the description of the SUPI in the private network in the first possible manner. Details are not described herein again.

In the fourth possible manner, because the terminal device has been successfully registered in the public network, the terminal device may obtain the GUTI that has been allocated by the core network to the terminal device. The mobility management network element may determine, based on the SUPI in the private network, that the terminal device is registered in the private network, and learn of, based on the SUPI in the private network, the network slice, for the private network, that the terminal device requests to access, to implement registration in the private network.

Optionally, in the fourth possible manner, the first information further includes one or more of the type information of the private network and the indication information of the private network.

In a fifth possible manner, for content of the first information, refer to the description of the content of the first information in the fourth possible manner. Details are not described herein again. In the fifth possible manner, the SUPI in the public network is different from the SUPI in the private network. A difference from the fourth possible manner is that the SUPI in the private network cannot be used to indicate the network slice, for the private network, that the terminal device requests to access. For example, the SUPI in the private network is allocated by the public network, and a structure of the SUPI in the private network is the same as that of the SUPI in the public network, including an MCC, an MNC, and an MSIN. For example, the SUPI in the public network and the SUPI in the private network have the same MCC and MNC but different MSINs. Therefore, being registered in the public network or the private network can be determined based on the different MSINs. For another example, a structure of the SUPI in the private network is different from that of a SUPI in an existing public network, and the SUPI in the private network includes an MCC, a private network flag (private network flag, PNF), and an MSIN. For example, the PNF may be used to indicate that the SUPI is a SUPI in the private network, but cannot be used to indicate the network slice for the private network. For example, the PNF may be one or more bits.

In the fifth possible manner, because the terminal device has been successfully registered in the public network, the terminal device may obtain the GUTI that has been allocated by the core network to the terminal device. The mobility management network element may determine, based on the SUPI in the private network, that the terminal device is registered in the private network. Because the SUPI in the private network cannot be used to indicate the network slice, for the private network, that the terminal device requests to access, the mobility management network element needs to determine, based on a correspondence between the network slice for the private network and the SUPI in the private network, the network slice, for the private network, that the terminal device requests to access, to implement registration in the private network. For example, the correspondence between the network slice for the private network and the SUPI in the private network is stored in the mobility management network element. Further, optionally, the mobility management network element may obtain the correspondence between the network slice for the private network and the SUPI in the private network from the UDM network element.

management network element may determine, based on the SUPI in the private network, that the terminal device is registered in the private network. Because the SUPI in the private network cannot be used to indicate the network slice, for the private network, that the terminal device requests to access, the mobility management network element may learn of, based on the indication information of the private network, the network slice, for the private network, that the terminal device requests to access, to implement registration in the private network.

Optionally, in the sixth possible manner, the first information further includes the type information of the private network.

TABLE 1

| | First information in scenario 1 | |
|---|---|---|
| | A SUPI in a public network is the same as a SUPI in a private network | A SUPI in a public network is different from a SUPI in a private network |
| A SUPI in a private network may be used to indicate a network slice, for the private network, that a terminal device requests to access | 1. GUTI of the terminal device and private-network information (one or more of the SUPI in the private network, type information of the private network, and indication information of the private network) | 4. GUTI of the terminal device and private-network information (SUPI in the private network), and optionally, one or more of type information of the private network and indication information of the private network |
| A SUPI in a private network cannot be used to indicate a network slice, for the private network, that a terminal device requests to access | 2. GUTI of the terminal device and private-network information (one or more of the SUPI in the private network, type information of the private network, and indication information of the private network) 3. GUTI of the terminal device and private-network information (indication information of the private network), and optionally, one or more of type information of the private network and the SUPI in the private network | 5. GUTI of the terminal device and private-network information (SUPI in the private network), and optionally, one or more of type information of the private network and indication information of the private network 6. GUTI of the terminal device and private-network information (SUPI in the private network and indication information of the private network), and optionally, type information of the private network |

Optionally, in the fifth possible manner, the first information further includes one or more of the type information of the private network and the indication information of the private network.

In a sixth possible manner, the first information includes the GUTI of the terminal device and the private-network information, and the private-network information includes the SUPI in the private network and the indication information of the private network. For example, the indication information of the private network is used to indicate the network slice, for the private network, that the terminal device requests to access. In this possible manner, the SUPI in the public network is different from the SUPI in the private network, and the SUPI in the private network cannot be used to indicate the network slice, for the private network, that the terminal device requests to access. For example, for the SUPI in the private network in this manner, refer to the description of the SUPI in the private network in the fifth possible manner. Details are not described herein again.

In the sixth possible manner, because the terminal device has been successfully registered in the public network, the terminal device may obtain the GUTI that has been allocated by the core network to the terminal device. The mobility Scenario 2: The terminal device has been successfully registered in the private network and then is registered in the public network.

For example, the first information in the scenario 2 is shown in Table 2, and the first information may include either of the following two manners:

In a first possible manner, the first information includes the GUTI of the terminal device and the public-network information, and the public-network information includes one or more of the following information: the SUPI in the public network, type information of the public network, and indication information of the public network. For example, the indication information of the public network is used to indicate the network slice, for the public network, that the terminal device requests to access. The type information of the public network is used to indicate that a registration type of the terminal device is the public network. In this possible manner, the SUPI in the public network is the same as the SUPI in the private network. For example, when the public-network information includes the SUPI, the mobility management network element may identify, based on both the GUTI and the SUPI that are carried in the first message, that the UE requests to be registered in the public network, and learn of, based on the SUPI, the network slice, for the public network, that the terminal device requests to access, so that the terminal device initiates registration in the public network.

In the first possible manner, when registered in the private network, the terminal device needs to send only the SUPI (initially registered in the private network) in the private network or the GUTI (re-registered in the private network) to the mobility management network element, and when registered in the public network, the terminal device needs to send the GUTI and the public-network information to the mobility management network element. Therefore, the mobility management network element may determine, based on the GUTI and the public-network information, that the terminal device is registered in the public network. For example, because the terminal device has been successfully registered in the private network, the core network has allocated the GUTI to the terminal device. In addition, because the terminal device has been successfully registered in the private network, the mobility management network element has obtained the SUPI in the private network. Further, because the SUPI in the public network is the same as the SUPI in the private network, even when the public-network information does not include the SUPI, the mobility management network element can also obtain the SUPI in the public network, and learn of, based on the SUPI in the public network, the network slice, for the public network, that the terminal device requests to access, to implement registration in the public network.

In a second possible manner, the first information includes the GUTI of the terminal device and the public-network information, and the public-network information includes the SUPI in the public network. In this possible manner, the SUPI in the public network is different from the SUPI in the private network.

In the second possible manner, because the terminal device has been successfully registered in the private network, the terminal device may obtain the GUTI that has been allocated by the core network to the terminal device. The mobility management network element may determine, based on the SUPI in the public network, that the terminal device is registered in the public network, and learn of, based on the SUPI in the public network, the network slice, for the public network, that the terminal device requests to access, to implement registration in the public network.

Optionally, in the second possible manner, the first information further includes one or more of the type information of the public network and the indication information of the public network.

In the scenario 3, the first information includes one or more of the SUPI in the public network and the SUPI in the private network. For example, the first information in the scenario 3 is shown in Table 3, and includes, for example, any one of the following six manners:

In a first possible manner, the first information includes the SUPI in the public network. For example, the SUPI in the public network is the same as the SUPI in the private network, and the SUPI in the private network may be used to indicate the network slice, for the private network, that the terminal device requests to access.

Optionally, in the first possible manner, the first information further includes one or more of the following information: the type information of the public network, the indication information of the public network, the type information of the private network, and the indication information of the private network. For example, the type of the network that the terminal device requests to access is the public network. The indication information of the public network is used to indicate the network slice, for the public network, that the terminal device requests to access. The type information of the private network is used to indicate that a registration type of the terminal device is the private network. The indication information of the private network is used to indicate the network slice, for the private network, that the terminal device requests to access.

In the first possible manner, the terminal device may be registered in both the public network and the private network in the following three different cases: (1) After receiving the SUPI in the public network (namely, the SUPI in the private network), the mobility management network element triggers the terminal device to be registered in both the public network and the private network by default. For example, the mobility management network element may learn of, based on the SUPI in the private network, the network slice, for the private network, that the terminal device requests to access, to implement registration in the private network. (2) After receiving the SUPI in the public network (namely, the SUPI in the private network), the mobility management network element registers the terminal device in the public network by default. In this case, the first information further includes one or more of the type information of the private network and the indication information of the private network, used to indicate the mobility management network element to register the terminal device in the private network. (3) After receiving the SUPI in the public network (namely, the SUPI in the private network), the mobility management network element registers the terminal device in the private network by default. In this

TABLE 2

| First information in scenario 2 | |
|---|---|
| A SUPI in a public network is the same as a SUPI in a private network | A SUPI in a public network is different from a SUPI in a private network |
| 1. GUTI of a terminal device and public-network information (one or more of the SUPI in the public network, type information of the public network, and indication information of the public network) | 2. GUTI of a terminal device and public-network information (SUPI in the public network), and optionally, one or more of type information of the public network and indication information of the public network |

Scenario 3: The terminal device is registered in neither the public network nor the private network and then is registered in both the public network and the private network.

case, the first information further includes one or more of the type information of the public network and the indication information of the public network, where the type information of the public network and the indication information of the public network are used to indicate the mobility management network element to register the terminal device in the public network.

In a second possible manner, for content of the first information, refer to the description of the content of the first information in the first possible manner. Details are not described herein again. In the second possible manner, the SUPI in the public network is the same as the SUPI in the private network. A difference from the first possible manner is that the SUPI in the private network cannot be used to indicate the network slice, for the private network, that the terminal device requests to access.

Optionally, in the second possible manner, the first information further includes one or more of the following information: the type information of the public network, the indication information of the public network, the type information of the private network, and the indication information of the private network.

In the second possible manner, for three cases in which the terminal device is registered in both the public network and the private network, refer to the descriptions of the three different cases in the first possible manner. Details are not described herein again. For example, the mobility management network element may learn of, in the following manner based on the SUPI in the private network, the network slice, for the private network, that the terminal device requests to access: Because the SUPI in the private network cannot be used to indicate the network slice, for the private network, that the terminal device requests to access, the mobility management network element needs to determine, based on a correspondence between the network slice for the private network and the SUPI in the private network, the network slice, for the private network, that the terminal device requests to access. For example, the correspondence between the network slice for the private network and the SUPI in the private network is stored in the mobility management network element. Further, optionally, the mobility management network element may obtain the correspondence between the network slice for the private network and the SUPI in the private network from a UDM network element.

In a third possible manner, the first information includes the SUPI in the public network and the indication information of the private network. For example, the SUPI in the public network is the same as the SUPI in the private network, and the SUPI in the private network cannot be used to indicate the network slice, for the private network, that the terminal device requests to access.

Optionally, in the third possible manner, the first information further includes one or more of the following information: the type information of the public network, the indication information of the public network, and the type information of the private network.

In the third possible manner, the terminal device may be registered in both the public network and the private network in the following three different cases: (1) After receiving the SUPI in the public network (namely, a SUPI in the private network) and the indication information of the private network, the mobility management network element registers the terminal device in both the public network and the private network by default. For example, the mobility management network element may register the UE in the public network by default based on the SUPI in the public network, and learn of, based on the indication information of the private network, the network slice, for the private network, that the terminal device requests to access, to implement registration in the private network. (2) After receiving the SUPI in the public network (namely, the SUPI in the private network) and the indication information of the public network, the mobility management network element registers the terminal device in both the public network and the private network by default. For example, the mobility management network element may register the UE in the private network by default based on the SUPI in the public network, and learn of, based on the indication information of the public network, the network slice, for the public network, that the terminal device requests to access, to implement registration in the public network. (3) After receiving the SUPI in the public network (namely, the SUPI in the private network) and the indication information of the private network, the mobility management network element registers the terminal device in the private network by default. In this case, the first information further includes one or more of the type information of the public network and the indication information of the public network, where the type information of the public network and the indication information of the public network are used to indicate the mobility management network element to register the terminal device in the public network.

In a fourth possible manner, the first information includes the SUPI in the public network and the SUPI in the private network. For example, the SUPI in the public network is different from the SUPI in the private network, and the SUPI in the private network may be used to indicate the network slice, for the private network, that the terminal device requests to access.

Optionally, in the fourth possible manner, the first information further includes one or more of the following information: the type information of the public network, the indication information of the public network, the type information of the private network, and the indication information of the private network.

In the fourth possible manner, the mobility management network element may determine, based on the SUPI in the public network and the SUPI in the private network, that the terminal device is registered in both the public network and the private network, and learn of, based on the SUPI in the private network, the network slice, for the private network, that the terminal device requests to access, to implement registration in the private network.

In a fifth possible manner, for content of the first information, refer to the description of the content of the first information in the fourth possible manner. Details are not described herein again. In the fifth possible manner, the SUPI in the public network is different from the SUPI in the private network. A difference from the fourth possible manner is that the SUPI in the private network cannot be used to indicate the network slice, for the private network, that the terminal device requests to access.

Optionally, in the fifth possible manner, the first information further includes one or more of the following information: the type information of the public network, the indication information of the public network, the type information of the private network, and the indication information of the private network.

In the fifth possible manner, the mobility management network element may determine, based on the SUPI in the public network and the SUPI in the private network, that the terminal device is registered in both the public network and the private network. Because the SUPI in the private network cannot be used to indicate the network slice, for the private network, that the terminal device requests to access, the mobility management network element needs to determine, based on a correspondence between the network slice for the private network and the SUPI in the private network, the network slice, for the private network, that the terminal device requests to access. For example, the correspondence between the network slice for the private network and the SUPI in the private network is stored in the mobility management network element. Further, optionally, the mobility management network element may obtain the correspondence between the network slice for the private network and the SUPI in the private network from the UDM network element.

In a sixth possible manner, the first information includes the SUPI in the public network, the SUPI in the private network, and the indication information of the private network. For example, the SUPI in the public network is different from the SUPI in the private network, and the SUPI in the private network cannot be used to indicate the network slice, for the private network, that the terminal device requests to access.

Optionally, in the sixth possible manner, the first information further includes one or more of the following information: the type information of the public network, the indication information of the public network, and the type information of the private network.

In the sixth possible manner, the mobility management network element may determine, based on the SUPI in the public network and the SUPI in the private network, that the terminal device is registered in both the public network and the private network, and learn of, based on the indication information of the private network, the network slice, for the private network, that the terminal device requests to access, to implement registration in the private network.

S202A: The mobility management network element obtains the user equipment context of the terminal device in the public network and the user equipment context of the terminal device in the private network based on the first information.

For example, in the three different scenarios in step S201A, a process in which the mobility management network element separately obtains the user equipment context of the terminal device in the public network and the user equipment context of the terminal device in the private network based on the first information is as follows:

In the scenario 1, because the terminal device has been successfully registered in the public network, the mobility management network element stores the user equipment context of the terminal device in the public network. The mobility management network element may obtain the user equipment context of the terminal device in the public network based on the GUTI in the first information received from the terminal device. A process in which the mobility management network element obtains the user equipment context of the terminal device in the private network based on the first information may be further described with reference to FIG. 3.

In the scenario 2, because the terminal device has been successfully registered in the private network, the mobility management network element stores the user equipment context of the terminal device in the private network. The mobility management network element may obtain the user equipment context of the terminal device in the private network based on the GUTI in the first information received from the terminal device. A process in which the mobility management network element obtains the user equipment

TABLE 3

| First information in scenario 3 | | |
| --- | --- | --- |
| | A SUPI in a public network is the same as a SUPI in a private network | A SUPI in a public network is different from a SUPI in a private network |
| A SUPI in a private network may be used to indicate a network slice, for the private network, that a terminal device requests to access | 1. SUPI in the public network, and optionally, one or more of type information of the public network, indication information of the public network, type information of the private network, and indication information of the private network | 4. SUPI in the public network and SUPI in the private network, and optionally, one or more of type information of the public network, indication information of the public network, type information of the private network, and indication information of the private network |
| A SUPI in a private network cannot be used to indicate a network slice, for the private network, that a terminal device requests to access | 2. SUPI in the public network, and optionally, one or more of type information of the public network, indication information of the public network, type information of the private network, and indication information of the private network | 5. SUPI in the public network and SUPI in the private network, and optionally, one or more of type information of the public network, indication information of the public network, type information of the private network, and indication information of the private network |
| | 3. SUPI in the public network and indication information of the private network, and optionally, one or more of type information of the public network, indication information of the public network, and type information of the private network | 6. SUPI in the public network, SUPI in the private network, and indication information of the private network, and optionally, one or more of type information of the public network, indication information of the public network, and type information of the private network | context of the terminal device in the public network based on the first information may be further described with reference to FIG. 4.

In the scenario 3, a process in which the mobility management network element obtains the user equipment context of the terminal device in the private network based on the first information may be further described with reference to FIG. 3. A process in which the mobility management network element obtains the user equipment context of the terminal device in the public network based on the first information may be further described with reference to FIG. 4.

S203A: The mobility management network element uses the user equipment context in the public network and the user equipment context in the private network as a user equipment context of the terminal device.

For example, after the terminal device is successfully registered in any network, a user equipment context obtained by the mobility management network element includes a 5G-GUTI, a permanent equipment identifier (permanent equipment identifier, PEI), a user equipment mobility management network capability (UE MM Network Capability), user location information (User Location Information), a registration area (Registration Area), a registration administration state (Registration management state, RM State), a UDM identifier (identifier, ID), an AUSF ID, and a SUPI. For example, the 5G-GUTI, the PEI, the user equipment mobility management network capability, the user location information, and the registration area are public information in different user equipment contexts that are obtained by the mobility management network element after a same terminal device is registered in different networks. The registration management state, the UDM ID, the AUSF ID, and the SUPI are specific information in the different user equipment contexts that are obtained by the mobility management network element after the same terminal device is registered in the different networks. For example, the user equipment context that is in the public network and that is obtained by the mobility management network element in step S202A includes a first 5G-GUTI, a first PEI, a first user equipment mobility management network capability, first user location information, a first registration area, a first registration management state, a first UDM ID, a first AUSF ID, and a first SUPI. The user equipment context in the private network includes the first 5G-GUTI, the first PEI, the first user equipment mobility management network capability, the first user location information, the first registration area, a second registration management state, a second UDM ID, a second AUSF ID, and a second SUPI. Alternatively, for another example, the user equipment context that is in the public network and that is obtained by the mobility management network element in step S202A includes a first 5G-GUTI, a first PEI, a first user equipment mobility management network capability, first user location information, a first registration area, a first registration management state, a first UDM ID, a first AUSF ID, and a first SUPI. The user equipment context in the private network includes a second registration management state, a second UDM ID, a second AUSF ID, and a second SUPI. In other words, for the same terminal device, public information in the user equipment context in the public network and the user equipment context in the private network is: the first 5G-GUTI, the first PEI, the first user equipment mobility management network capability, the first user location information, and the first registration area. The first registration management state, the first UDM ID, the first AUSF ID, and the first SUPI are specific information in the user equipment context in the public network, and the second registration management state, the second UDM ID, the second AUSF ID, and the second SUPI are specific information in the user equipment context in the private network. The GUTIs allocated by the network to the terminal device are the same, that is, each of the GUTIs is the first 5G-GUTI. Therefore, the mobility management network element can determine the user equipment context that is in the public network and that corresponds to the same terminal device and the user equipment context that is in the private network and that corresponds to the same terminal device, and use the user equipment context in the public network and the user equipment context in the private network as the user equipment context of the terminal device. For example, that the mobility management network element uses the user equipment context in the public network and the user equipment context in the private network as the user equipment context of the terminal device includes: the first 5G-GUTI, the first PEI, the first user equipment mobility management network capability, the first user location information, the first registration area, the first registration management state, the first UDM ID, the first AUSF ID, the first SUPI, the second registration management state, the second UDM ID, the second AUSF ID, and the second SUPI.

According to the method in this embodiment of the present invention, the terminal device may be registered in both the public network and the private network, so that the network obtains the user equipment context of the terminal device in the public network and the user equipment context of the terminal device in the private network, to implement access of the terminal device to the public network and the private network, and improve user experience. After the terminal device is registered in the private network, the private network can manage and control security and privacy data of the terminal device, so that the enterprise private network can independently manage enterprise user data.

Figure 2B:
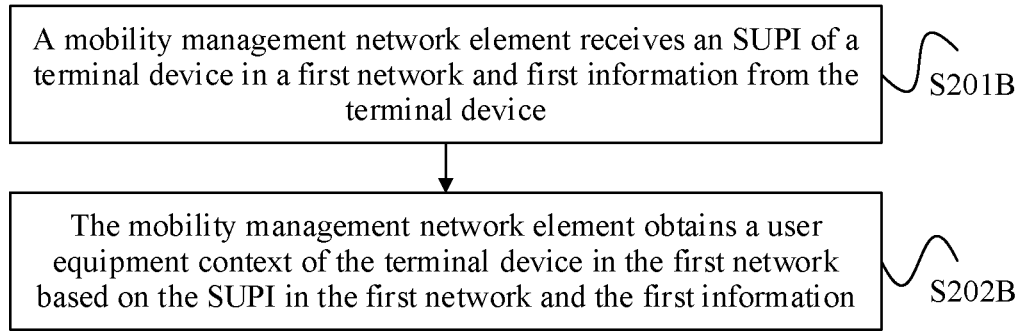
FIG. 2B is a flowchart of another communication method according to an embodiment of this application.

FIG. 2B is a flowchart of another communication method according to an embodiment of this application. The method is applicable to the communications system shown in FIG. 1. According to the method, in the 5G communications system shown in FIG. 1, when a terminal device is registered in neither a public network nor a private network, the terminal device may be registered in the public network, so that a network obtains a user equipment context of the terminal device in the public network; or the terminal device may be registered in the private network, so that a network obtains a user equipment context of the terminal device in the private network. The method may include the following steps.

S201B: A mobility management network element receives a SUPI of the terminal device in a first network and first information from the terminal device.

For example, the mobility management network element is the AMF network element 104 in FIG. 1, and the terminal device is the terminal device 101 in FIG. 1.

For example, the first information is one or more of a registration type of the first network and indication information of the first network. For example, the first network is the public network or the private network.

In the following two different application scenarios, the first information may include any one of the following plurality of manners.

Scenario 1: The terminal device is registered in neither the public network nor the private network, the first network is the private network, and the terminal device is registered only in the private network.

For example, the first information in the scenario 1 is shown in Table 4, and includes, for example, any one of the following six manners:

In a first possible manner, the first information includes a SUPI in the private network and one or more of the following information: type information of the private network and indication information of the private network. In this possible manner, a SUPI in the public network is the same as the SUPI in the private network, and the SUPI in the private network may be used to indicate a network slice, for the private network, that the terminal device requests to access.

In the first possible manner, after receiving the SUPI in the public network (namely, the SUPI in the private network), the mobility management network element registers the terminal device in the public network by default. Therefore, the mobility management network element may determine, based on at least two pieces of information included in the first information, that the terminal device is registered in the private network. For example, the mobility management network element may learn of, based on the SUPI in the private network, the network slice, for the private network, that the terminal device requests to access, to implement registration in the private network.

In a second possible manner, the first information includes a SUPI in the private network and indication information of the private network. In this possible manner, a SUPI in the public network is the same as the SUPI in the private network, and the SUPI in the private network cannot be used to indicate a network slice, for the private network, that the terminal device requests to access.

Optionally, the first information further includes type information of the private network.

In the second possible manner, after receiving the SUPI in the public network (namely, the SUPI in the private network), the mobility management network element registers the terminal device in the public network by default. Therefore, the mobility management network element may determine, based on at least two pieces of information included in the first information, that the terminal device is registered in the private network. Because the SUPI in the private network cannot be used to indicate the network slice, for the private network, that the terminal device requests to access, the mobility management network element may learn of, based on the indication information of the private network, the network slice, for the private network, that the terminal device requests to access, to implement registration in the private network.

In a third possible manner, the first information includes a SUPI in the private network. In this possible manner, a SUPI in the public network is the same as the SUPI in the private network, and the SUPI in the private network may be used to indicate a network slice, for the private network, that the terminal device requests to access.

Optionally, the first information further includes one or more of type information of the private network and indication information of the private network.

In the third possible manner, after receiving the SUPI in the public network (namely, the SUPI in the private network), the mobility management network element registers the terminal device in the private network by default. Therefore, the mobility management network element may determine, based on the SUPI in the private network in the first information, that the terminal device is registered in the private network. In addition, the mobility management network element may learn of, based on the SUPI in the private network, the network slice, for the private network, that the terminal device requests to access, to implement registration in the private network.

In a fourth possible manner, the first information includes a SUPI in the private network and indication information of the private network. In this possible manner, a SUPI in the public network is the same as the SUPI in the private network, and the SUPI in the private network cannot be used to indicate a network slice, for the private network, that the terminal device requests to access.

Optionally, the first information further includes type information of the private network.

In the fourth possible manner, after receiving the SUPI in the public network (namely, the SUPI in the private network), the mobility management network element registers the terminal device in the private network by default. Therefore, the mobility management network element may determine, based on the SUPI in the private network in the first information, that the terminal device is registered in the private network. Because the SUPI in the private network cannot be used to indicate the network slice, for the private network, that the terminal device requests to access, the mobility management network element may learn of, based on the indication information of the private network, the network slice, for the private network, that the terminal device requests to access, to implement registration in the private network.

In a fifth possible manner, the first information includes a SUPI in the private network. In this possible manner, a SUPI in the public network is different from the SUPI in the private network, and the SUPI in the private network may be used to indicate a network slice, for the private network, that the terminal device requests to access.

Optionally, the first information further includes one or more of type information of the private network and indication information of the private network.

In the fifth possible manner, because the SUPI in the public network is different from the SUPI in the private network, the mobility management network element may determine, based on the SUPI in the private network in the first information, that the terminal device is registered in the private network. In addition, the mobility management network element may learn of, based on the SUPI in the private network, the network slice, for the private network, that the terminal device requests to access, to implement registration in the private network.

In a sixth possible manner, the first information includes a SUPI in the private network and indication information of the private network. In this possible manner, a SUPI in the public network is different from the SUPI in the private network, and the SUPI in the private network cannot be used to indicate a network slice, for the private network, that the terminal device requests to access.

Optionally, the first information further includes type information of the private network.

In the sixth possible manner, because the SUPI in the public network is different from the SUPI in the private network, the mobility management network element may determine, based on the SUPI in the private network in the first information, that the terminal device is registered in the private network. Because the SUPI in the private network cannot be used to indicate the network slice, for the private network, that the terminal device requests to access, the mobility management network element may learn of, based on the indication information of the private network, the network slice, for the private network, that the terminal device requests to access, to implement registration in the private network.

TABLE 4

First information in scenario 1

A SUPI in a public network is the same as a SUPI in a private network

|  | When there is only the SUPI, registration in the public network is performed by default | When there is only the SUPI, registration in the private network is performed by default | A SUPI in a public network is different from a SUPI in a private network |
|---|---|---|---|
| A SUPI in a private network may be used to indicate a network slice, for the private network, that a terminal device requests to access | 1. SUPI in the private network and one or more pieces of the following information: type information of the private network and indication information of the private network | 3. SUPI in the private network, and optionally, one or more of type information of the private network and indication information of the private network | 5. SUPI in the private network, and optionally, one or more of type information of the private network and indication information of the private network |
| A SUPI in a private network cannot be used to indicate a network slice, for the private network, that a terminal device requests to access | 2. SUPI in the private network and indication information of the private network, and optionally, type information of the private network | 4. SUPI in the private network and indication information of the private network, and optionally, type information of the private network | 6. SUPI in the private network and indication information of the private network, and optionally, type information of the private network |

Scenario 2: The terminal device is registered in neither the public network nor the private network, the first network is the public network, and the terminal device is registered only in the public network.

For example, the first information in the scenario 2 is shown in Table 5, and includes, for example, any one of the following three manners:

In a first possible manner, the first information includes a SUPI in the public network. In this possible manner, the SUPI in the public network is the same as a SUPI in the private network.

Optionally, the first information further includes one or more of type information of the public network and indication information of the public network.

In the first possible manner, after receiving the SUPI in the public network (namely, the SUPI in the private network), the mobility management network element registers the terminal device in the public network by default. Therefore, the mobility management network element may determine, based on the SUPI in the public network in the first information, that the terminal device is registered in the public network.

In a second possible manner, the first information includes a SUPI in the public network and one or more of the following information: type information of the public network and indication information of the public network. In this possible manner, the SUPI in the public network is the same as a SUPI in the private network.

In the second possible manner, after receiving the SUPI in the public network (namely, the SUPI in the private network), the mobility management network element registers the terminal device in the private network by default. Therefore, the mobility management network element may determine, based on at least two pieces of information included in the first information, that the terminal device is registered in the public network.

In a third possible manner, the first information includes a SUPI in the public network. In this possible manner, the SUPI in the public network is different from a SUPI in the public network.

Optionally, the first information further includes one or more of type information of the public network and indication information of the public network.

In the third possible manner, because the SUPI in the public network is different from the SUPI in the private network, the mobility management network element may determine, based on the SUPI in the public network in the first information, that the terminal device is registered in the public network.

TABLE 5

First information in scenario 2

A SUPI in a public network is the same as a SUPI in a private network

| When there is only the SUPI, registration in the public network is performed by default | When there is only the SUPI, registration in the private network is performed by default | A SUPI in a public network is different from a SUPI in a private network |
|---|---|---|
| 1. SUPI in the public network, and optionally, one or more of type information of the public network and indication | 2. SUPI in the public network and one or more of the following information: type information of the | 3. SUPI in the public network, and optionally, one or more of type information of the public |

TABLE 5-continued

First information in scenario 2

A SUPI in a public network is the same as a SUPI in a private network

| When there is only the SUPI, registration in the public network is performed by default | When there is only the SUPI, registration in the private network is performed by default | A SUPI in a public network is different from a SUPI in a private network |
|---|---|---|
| information of the public network | public network and indication information of the public network | network and indication information of the public network |

S202B: The mobility management network element obtains a user equipment context of the terminal device in the first network based on the SUPI in the first network and the first information.

For example, in the scenario 1 in step S201B, a process in which the mobility management network element obtains the user equipment context of the terminal device in the private network based on the SUPI in the private network and the first information may be further described with reference to FIG. 3.

For example, in the scenario 2 in step S201B, a process in which the mobility management network element obtains the user equipment context of the terminal device in the public network based on the SUPI in the public network and the first information may be further described with reference to FIG. 4.

According to the method in this embodiment of the present invention, the terminal device may be registered in the public network, so that the network obtains the user equipment context of the terminal device in the public network, to implement access of the terminal device to the public network. Alternatively, the terminal device may be registered in the private network, so that the network obtains the user equipment context of the terminal device in the private network, to implement access of the terminal device to the private network. After the terminal device is registered in the private network, the private network can manage and control security and privacy data of the terminal device, so that the enterprise private network can independently manage enterprise user data.

Figure 3:
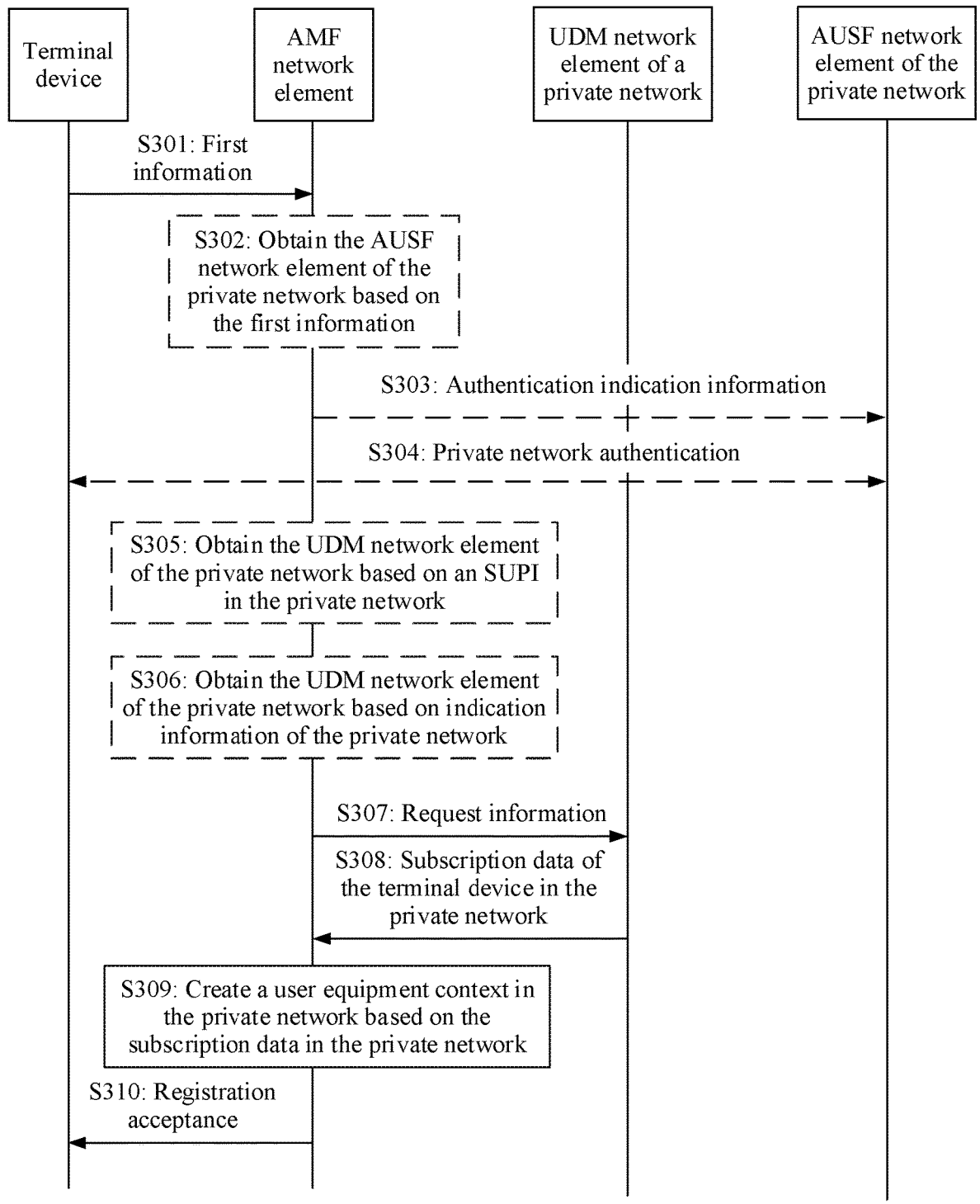
FIG. 3 is a flowchart of still another communication method according to an embodiment of this application.

FIG. 3 is a flowchart of still another communication method according to an embodiment of this application. The method is applicable to the communications system shown in FIG. 1. According to the method, in the 5G communications system shown in FIG. 1, a terminal device may be registered in a private network, thereby obtaining a user equipment context in the private network. The method may include the following steps.

S301: The terminal device sends first information to an AMF network element. Correspondingly, the AMF network element receives the first information from the terminal device.

For example, the terminal device is the terminal device 101 in FIG. 1. The AMF network element is the AMF network element 104 in FIG. 1, or may be the mobility management network element in FIG. 2A.

For step S301, refer to the descriptions of step S201A in the scenario 1 and the scenario 3 in FIG. 2A and step S201B in the scenario 1 in FIG. 2B. Details are not described herein again.

S307: The AMF network element sends request information to a UDM network element of the private network based on the first information. Correspondingly, the UDM network element of the private network receives the request information from the AMF network element.

For example, the UDM network element of the private network is the UDM network element 108 in FIG. 1.

For example, the request information is used to obtain subscription data of the user equipment in the private network. For example, the AMF network element sends the request information to the UDM network element of the private network through an Nudm_SDM_Get service request message.

S308: The UDM network element of the private network sends the subscription data of the terminal device in the private network to the AMF network element. Correspondingly, the AMF network element receives the subscription data of the terminal device in the private network from the UDM network element of the private network.

For example, the UDM network element of the private network sends the subscription data of the terminal device in the private network to the AMF network element through an Nudm_SDM_Get service response message.

S309: The AMF network element creates the user equipment context in the private network based on the subscription data in the private network.

For example, the user equipment context in the private network includes a registration management state, a UDM ID, an AUSF ID, and a SUPI. Optionally, the user equipment context in the private network further includes a 5G-GUTI, a PEI, a user equipment mobility management network capability, user location information, and a registration area.

S310: The AMF network element sends registration acceptance to the terminal device. Correspondingly, the terminal device receives the registration acceptance from the AMF network element.

For example, the registration acceptance information is used to notify the terminal device that registration in the private network is completed.

According to the method in this embodiment of the present invention, in the 5G communications system shown in FIG. 1, the terminal device may be registered in the private network, and obtain the user equipment context of the terminal device in the private network, to access a service of the private network.

For example, before step S307, the AMF network element may obtain an AUSF network element of the private network through steps S302 to S304, to authenticate the terminal device. For example, steps S302 and S304 are optional steps. In other words, the AMF network element may determine, based on a network operator policy, not to perform an authentication procedure. Alternatively, the AMF network element may determine the AUSF network element of the private network in another manner. This is not limited in this embodiment.

S302: The AMF network element obtains the AUSF network element of the private network based on the first information.

For example, the AUSF network element of the private network is the AUSF network element 107 in FIG. 1.

For example, the AMF network element determines, based on the SUPI in the private network and/or indication information of the private network in the first information, a network slice, for the private network, that the terminal device requests to access, to select an AUSF network element of the network slice as the AUSF network element of the private network. For example, the indication information of the private network is S-NSSAI, and the AMF network element may select, based on an SD, an SST, or a combination of an SD and an SST in the S-NSSAI, a network slice, for the private network, that the terminal device requests to access. The AMF network element selects the AUSF network element through an NSSF network element. For example, the AMF network element sends one or more of a private network identifier (a PLMN ID/PNC in the SUPI), a SUCI, the SUPI, or the indication information of the private network to the NSSF network element, and the NSSF network element returns an identifier of the AUSF network element of the private network to the AMF network element. Alternatively, the AMF network element selects the AUSF network element through an NRF network element. For example, the AMF network element sends one or more of a private network identifier (a PLMN ID/PNC in the SUPI), the SUPI, a routing identifier of a SUCI (where the routing ID is a part of the SUCI), and the indication information of the private network to the NRF network element, the NRF network element returns one or more candidate AUSF network elements to the AMF network element, and the AMF network element selects, for example, one proper AUSF network element. Alternatively, the AMF network element stores a third correspondence between the SUPI and the AUSF network element of the private network and/or a fourth correspondence between the indication information of the private network and the AUSF network element of the private network, and the AMF network element obtains the AUSF network element of the private network based on the third correspondence and/or the fourth correspondence.

S303: The AMF network element sends authentication indication information to the AUSF network element of the private network. For example, correspondingly, the AUSF network element of the private network receives the authentication indication information from the AMF network element.

For example, the AMF network element determines, based on policy information configured in the AMF network element, that private-network authentication needs to be performed on the terminal device.

Optionally, the authentication indication information is used to indicate the AUSF network element of the private network to perform extensible authentication protocol-authentication and key agreement (Extensible Authentication Protocol Authentication and Key Agreement, EAP AKA) authentication on the terminal device.

S304: The AUSF network element of the private network performs private-network authentication.

For example, the AMF network element sends an authentication request to the AUSF network element, and the AUSF network element sends a first message to the UDM network element based on the authentication request, where the first message is used to request an authorization vector. The UDM network element generates, based on the first message, the authorization vector required for an EAP AKA authentication manner, and sends the authorization vector to the AUSF network element. After receiving the authorization vector, the AUSF network element returns the authorization vector to the AMF network element. Then, the AMF network element performs a process of authentication between the AMF network element and the UE based on the authorization vector. For example, the first message is an Nudm_Authentication_Get Request message. Therefore, the AMF network element obtains the AUSF network element of the private network and authenticates the terminal device, so that the enterprise private network implements a security management and control requirement for an enterprise user, thereby ensuring security and privacy of user data.

For example, before step S307, the AMF network element may obtain the UDM network element of the private network through step S305 or step S306. For example, when the first information includes the SUPI in the private network, the UDM network element of the private network may be obtained through step S305. When the first information includes the indication information of the private network, the UDM network element of the private network may be obtained through step S306. When the first information includes both the SUPI in the private network and the indication information of the private network, the UDM network element of the private network may be obtained through step S305 or step S306. It should be noted that both S305 and step S306 are optional steps. In other words, the AMF network element may alternatively obtain the UDM network element of the private network in another manner. This is not limited in this embodiment.

S305: The first information includes the SUPI in the private network, and the AMF network element obtains the UDM network element of the private network based on the SUPI in the private network.

For example, the AMF network element obtains the UDM network element of the private network from a network slice selection function network element, a network database in the public network, or a network repository function network element of the public network based on the SUPI in the private network.

Alternatively, for another example, the AMF network element obtains the UDM network element of the private network based on the SUPI in the private network and a first correspondence. For example, the first correspondence is a correspondence between the SUPI in the private network and the UDM network element of the private network.

Therefore, when the first information includes the SUPI in the private network, the AMF network element may obtain the UDM network element of the private network based on the first information, to obtain the subscription data of the terminal device in the private network from the UDM network element.

S306: The first information includes indication the information of the private network, and the AMF network element obtains the UDM network element of the private network based on the indication information of the private network.

For example, the AMF network element obtains the UDM network element of the private network from the network slice selection function network element, the network database in the public network, or the network repository function network element of the public network based on the indication information of the private network.

Alternatively, for another example, the AMF network element obtains the UDM network element of the private network based on the indication information of the private network and a second correspondence. For example, the second correspondence is a correspondence between the indication information of the private network and the UDM network element of the private network.

Therefore, when the first information includes the indication information of the private network, the AMF network element may obtain the UDM network element of the private network based on the first information, to obtain the subscription data of the terminal device in the private network from the UDM network element.

It should be noted that a sequence of step S302 and step S305 is not limited in this application. In other words, step S302 may be performed before step S305, or step S305 may be performed before step S302, or step S302 and step S305 are performed simultaneously. A sequence of step S302 and step S306 is not limited in this application either. In other words, step S302 may be performed before step S306, or step S306 may be performed before step S302, or step S302 and step S306 are performed simultaneously.

Figure 4:
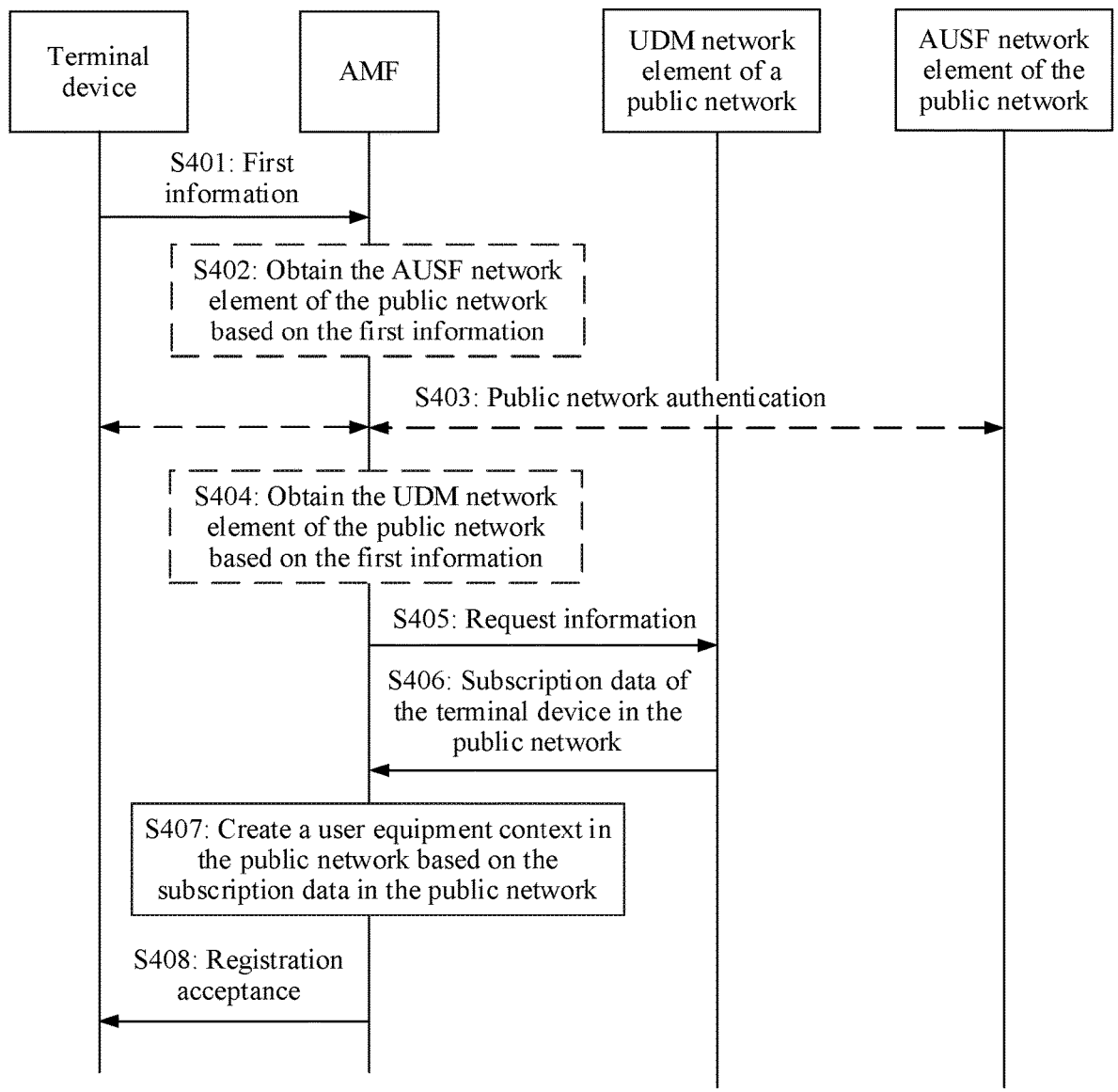
FIG. 4 is a flowchart of yet another communication method according to an embodiment of this application.

FIG. 4 is a flowchart of yet another communication method according to an embodiment of this application. The method is applicable to the communications system shown in FIG. 1. According to the method, in the 5G communications system shown in FIG. 1, a terminal device may be registered in a public network, thereby obtaining a user equipment context in the public network. The method may include the following steps.

S401: The terminal device sends first information to an AMF network element. Correspondingly, the AMF network element receives the first information from the terminal device.

For example, the terminal device is the terminal device 101 in FIG. 1. The AMF network element is the AMF network element 104 in FIG. 1, or may be the mobility management network element in FIG. 2A.

For step S401, refer to the descriptions of step S201A in the scenario 2 and the scenario 3 in FIG. 2A and step S201B in the scenario 2 in FIG. 2B. Details are not described herein again.

S405: The AMF network element sends request information to a UDM network element of the public network based on the first information. Correspondingly, the UDM network element of the public network receives the request information from the AMF network element.

For example, the UDM network element of the public network is the UDM network element 108 in FIG. 1.

For example, the request information is used to obtain subscription data of the user equipment in the public network. For example, the AMF network element sends the request information to the UDM network element of the public network through an Nudm_SDM_Get service request message.

S406: The UDM network element of the public network sends the subscription data of the terminal device in the public network to the AMF network element. Correspondingly, the AMF network element receives the subscription data of the terminal device in the public network from the UDM network element of the public network.

For example, the UDM network element of the public network sends the subscription data of the terminal device in the public network to the AMF network element through an Nudm_SDM_Get service response message.

S407: The AMF network element creates the user equipment context in the public network based on the subscription data in the public network.

For example, the user equipment context in the public network includes a 5G-GUTI, a PEI, a user equipment mobility management network capability, user location information, a registration area, a registration management state, a UDM ID, an AUSF ID, and a SUPI.

S408: The AMF network element sends registration acceptance to the terminal device. Correspondingly, the terminal device receives the registration acceptance from the AMF network element.

For example, the registration acceptance information is used to notify the terminal device that registration in the public network is completed.

According to the method in this embodiment of the present invention, in the 5G communications system shown in FIG. 1, the terminal device may be registered in the public network, and obtain the user equipment context of the terminal device in the public network, to access a service of the public network.

For example, before step S405, the AMF network element may obtain an AUSF network element of the public network through steps S402 and S403, to authenticate the terminal device. For example, steps S402 and S403 are optional steps. In other words, the AMF network element may determine, based on a network operator policy, not to perform an authentication procedure. Alternatively, the AMF network element may determine the AUSF network element of the public network in another manner. This is not limited in this embodiment.

S402: The AMF network element obtains the AUSF network element of the public network based on the first information.

For example, the AUSF network element of the public network is the AUSF network element 107 in FIG. 1.

For example, the AMF network element determines, based on the SUPI in the public network in the first information, a network slice, for the public network, that the terminal device requests to access.

S403: Perform public network authentication on the terminal device.

Therefore, the AMF network element obtains the AUSF network element of the public network and authenticates the terminal device, so that the public network implements a security management and control requirement for a user, thereby ensuring security and privacy of user data.

S404: The AMF network element obtains the UDM network element of the public network based on the first information.

For example, the AMF network element obtains the UDM network element of the public network based on the SUPI in the public network in the first information.

Therefore, when the first information includes the SUPI in the public network, the AMF network element may obtain the UDM network element of the public network based on the first information, to obtain the subscription data of the terminal device in the public network from the UDM network element.

In the foregoing embodiments provided in this application, the solutions of the communication method provided in the embodiments of this application are separately described from a perspective of the network elements and from a perspective of interaction between the network elements. It may be understood that, to implement the foregoing functions, the network elements and the devices, for example, the radio access network device, the access and mobility management function network element, the user equipment, the data management function network element, and the network slice selection function network element, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5A:
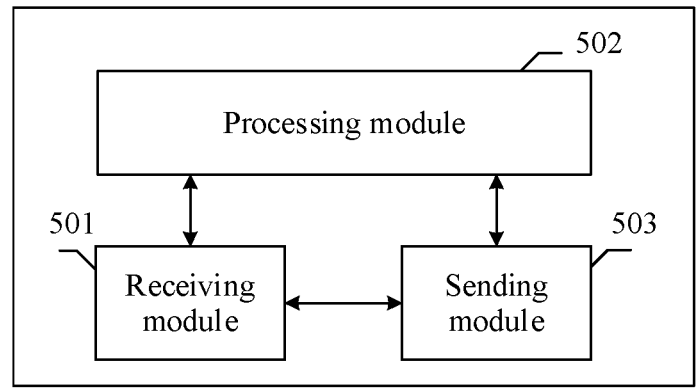
FIG. 5A and FIG. 5B each are a schematic structural diagram of a communications apparatus according to an embodiment of this application.

For example, when the foregoing network elements implement the corresponding functions by using the software modules, as shown in FIG. 5A, a communications apparatus may include a receiving module 501, a processing module 502, and a sending module 503.

In an embodiment, the communications apparatus may be configured to perform an operation of the mobility management network element (for example, the AMF network element) in FIG. 4 and FIG. 3.

For example, the receiving module 501 is configured to receive first information from a terminal device. The processing module 502 is configured to obtain a user equipment context of the terminal device in a public network and a user equipment context of the terminal device in a private network based on the first information. The processing module 502 is further configured to use the user equipment context in the public network and the user equipment context in the private network as a user equipment context of the terminal device.

Therefore, by using the communications apparatus in this embodiment of the present invention, the terminal device may be registered in both the public network and the private network, so that a network obtains the user equipment context of the terminal device in the public network and the user equipment context of the terminal device in the private network, to implement access of the terminal device to the public network and the private network, and improve user experience. After the terminal device is registered in the private network, the private network can manage and control security and privacy data of the terminal device, so that the enterprise private network can independently manage enterprise user data.

Optionally, the first information includes a GUTI of the terminal device and private-network information, and the private-network information includes one or more of the following information: a SUPI, type information of the private network, and indication information of the private network. For example, the indication information of the private network is used to indicate a network slice, for the private network, that the terminal device requests to access. The type information of the private network is used to indicate that a type of a network that the terminal device requests to access is the private network. For example, the type information of the private network may be the network slice for the private network. Alternatively, the first information includes a GUTI of the terminal device and public-network information, and the public-network information includes one or more of the following information: a SUPI in the public network, type information of the public network, and indication information of the public network. For example, the indication information of the public network is used to indicate a network slice, for the public network, that the terminal device requests to access. The type information of the public network is used to indicate that a type of a network that the terminal device requests to access is the public network. For example, the type information of the public network may be the network slice for the public network. Alternatively, the first information includes one or more of a SUPI in the public network and a SUPI in the private network.

Optionally, the first information further includes one or more of the following information: type information of the public network, indication information of the public network, type information of the private network, and indication information of the private network.

Optionally, the sending module 503 is configured to send request information to a data management network element of the private network based on the first information. The receiving module 501 is configured to receive subscription data of the terminal device in the private network from the data management network element of the private network. The processing module 502 is configured to create the user equipment context in the private network based on the subscription data in the private network.

Optionally, when the first information includes the SUPI in the private network, the processing module 502 is further configured to obtain the data management network element of the private network based on the SUPI in the private network and a first correspondence between the SUPI in the private network and the data management network element of the private network.

Optionally, the first information includes the SUPI in the private network, and the processing module 502 is further configured to obtain the data management network element of the private network from a network slice selection function network element, a network database in the public network, or a network repository function network element of the public network based on the SUPI in the private network.

Optionally, when the first information includes the indication information of the private network, the processing module 502 is further configured to obtain the data management network element of the private network based on the indication information of the private network and a second correspondence between the indication information of the private network and the data management network element of the private network.

Optionally, the first information includes the indication information of the private network, and the processing module 502 is further configured to obtain the data management network element of the private network from a network slice selection function network element, a network database in the public network, or a network repository function network element of the public network based on the indication information of the private network.

Optionally, before that the sending module 503 sends the request information to the data management network element of the private network based on the first information, the processing module 502 is further configured to obtain an authentication service network element of the private network based on the first information.

Optionally, the sending module 503 is further configured to send authentication indication information to the authentication service network element of the private network, where the authentication indication information is used to indicate the authentication service network element of the private network to perform EAP-AKA authentication on the terminal device.

In addition, the receiving module 501, the processing module 502, and the sending module 503 in the communications apparatus may further implement another operation or function of the mobility management network element in the foregoing methods, and details are not described herein again.

In another embodiment, the communications apparatus shown in FIG. 5A may be further configured to perform an operation of the mobility management network element (for example, the AMF network element) in FIG. 4 and FIG. 3. For example, the receiving module 501 is configured to receive a SUPI in a first network and first information from a terminal device. The first information is one or more of type information of the first network and indication information of the first network. For example, the indication information of the first network is used to indicate a network slice, for the first network, that the terminal device requests to access. The type information of the first network is used to indicate a type of a network that the terminal device requests to access. For example, the type information of the first network may be the network slice for the first network. The processing module 502 is configured to obtain a user equipment context of the terminal device in the first network based on the SUPI and the first information.

Therefore, by using the communications apparatus in this embodiment of the present invention, when the terminal device is not registered in the first network, the terminal device may initiate initial registration in the first network by using the SUPI in the first network and the first information, so that the terminal device accesses the first network.

Optionally, the sending module 503 is configured to send request information to a data management network element of the first network based on the SUPI and the first information. The receiving module 501 is configured to receive subscription data of the terminal device in the first network from the data management network element of the first network. The processing module 502 is configured to create the user equipment context in the first network based on the subscription data in the first network.

Optionally, the processing module 502 is configured to select the data management network element of the first network based on the SUPI in the first network and a first correspondence between the SUPI in the first network and the data management network element of the first network.

Optionally, the first information includes the SUPI in the first network, and the processing module 502 is configured to select the data management network element of the first network from the mobility management network element, a network slice selection function network element, a network database in a public network, or a network repository function network element of the public network based on the SUPI in the first network.

Optionally, when the first information includes the indication information of the first network, the processing module 502 is configured to select the data management network element of the first network based on the indication information of the first network and a second correspondence between the indication information of the first network and the data management network element of the first network.

Optionally, the first information includes the indication information of the first network, and the processing module 502 is configured to select the data management network element of the first network from a network slice selection function network element, a network database in a public network, or a network repository function network element of the public network based on the indication information of the first network.

Optionally, before that the sending module 503 sends the request information to the data management network element of the first network based on the SUPI and the first information, the processing module 502 is further configured to select an authentication service network element of the first network based on the SUPI and the first information.

Optionally, the sending module 503 is configured to send an authentication request to the authentication service network element of the first network.

In addition, the receiving module 501, the processing module 502, and the sending module 503 in the communications apparatus may further implement another operation or function of the mobility management network element in the foregoing methods, and details are not described herein again.

In another embodiment, the communications apparatus shown in FIG. 5A may be further configured to perform an operation of the terminal device (for example, the UE) in FIG. 3 and FIG. 4. For example, the sending module 503 is configured to send first information to a mobility management network element. The receiving module 501 is configured to receive a registration acceptance message from the mobility management network element. The processing module 502 is configured to obtain a user equipment context of the terminal device in a public network and a user equipment context of the terminal device in a private network based on the registration acceptance message. The processing module 502 is further configured to use the user equipment context in the public network and the user equipment context in the private network as a user equipment context.

Therefore, by using the communications apparatus in this embodiment of the present invention, when the terminal device is registered in neither the public network nor the private network, the terminal device may initiate initial registration in both the public network and the private network by using the first information, so that a network obtains the user equipment context of the terminal device in the public network and the user equipment context of the terminal device in the private network, to implement access of the terminal device to the public network and the private network, and improve user experience. After the terminal device is registered in the private network, the private network can manage and control security and privacy data of the terminal device, so that the enterprise private network can independently manage enterprise user data.

Optionally, the first information includes one or more of a SUPI in the public network and a SUPI in the private network.

Optionally, the first information further includes one or more of the following information: type information of the public network, indication information of the public network, type information of the private network, and indication information of the private network. For example, the indication information of the public network is used to indicate a network slice, for the public network, that the terminal device requests to access, and the indication information of the private network is used to indicate a network slice, for the private network, that the terminal device requests to access.

In addition, the receiving module 501, the processing module 502, and the sending module 503 in the communications apparatus may further implement another operation or function of the terminal device in the foregoing methods, and details are not described herein again.

In another embodiment, the communications apparatus shown in FIG. 5A may be further configured to perform an operation of the terminal device (for example, the UE) in FIG. 3 and FIG. 4. For example, the communications apparatus has a user equipment context of the terminal device in a first network. The sending module 503 is configured to send first information to a mobility management network element. The receiving module 501 is configured to receive a registration acceptance message from the mobility management network element. The processing module 502 is configured to obtain a user equipment context of the terminal device in a second network based on the registration acceptance message. The processing module 502 is further configured to use the user equipment context in the first network and the user equipment context in the second network as a user equipment context of the terminal device.

Therefore, by using the communications apparatus in this embodiment of the present invention, when the terminal device has been registered in the public network, the terminal device may initiate registration in the private network by using the first information; or when the terminal device has been registered in the private network, the terminal device may initiate registration in the public network by using the first information. In the foregoing two scenarios, access of the terminal device to the public network and the private network can be implemented, to improve user experience.

Optionally, the first information includes a GUTI of the terminal device and second network information. The second network information includes one or more of the following information: a SUPI in the second network, type information of the second network, and indication information of the second network. For example, the indication information of the second network is used to indicate a network slice, for the second network, that the terminal device requests to access. The type information of the second network is used to indicate a type of a network that the terminal device requests to access. For example, the type information of the second network may be the network slice for the second network.

In addition, the receiving module 501, the processing module 502, and the sending module 503 in the communications apparatus may further implement another operation or function of the terminal device in the foregoing methods, and details are not described herein again.

In another embodiment, the communications apparatus shown in FIG. 5A may be further configured to perform an operation of the terminal device (for example, the UE) in FIG. 3 and FIG. 4. For example, the sending module 503 is configured to send a SUPI in a first network and first information to a mobility management network element. The first information is one or more of type information of the first network and indication information of the first network. For example, the indication information of the first network is used to indicate a network slice, for the first network, that the terminal device requests to access. The receiving module 501 is configured to receive a registration acceptance message from the mobility management network element. The processing module 502 is configured to obtain a user equipment context of the terminal device in the first network based on the registration acceptance message.

Therefore, by using the communications apparatus in this embodiment of the present invention, when the terminal device is not registered in the first network, the terminal device may initiate initial registration in the first network by using the SUFI in the first network and the first information, so that the terminal device accesses the first network.

In addition, the receiving module 501, the processing module 502, and the sending module 503 in the communications apparatus may further implement another operation or function of the terminal device in the foregoing methods, and details are not described herein again.

Figure 5B:
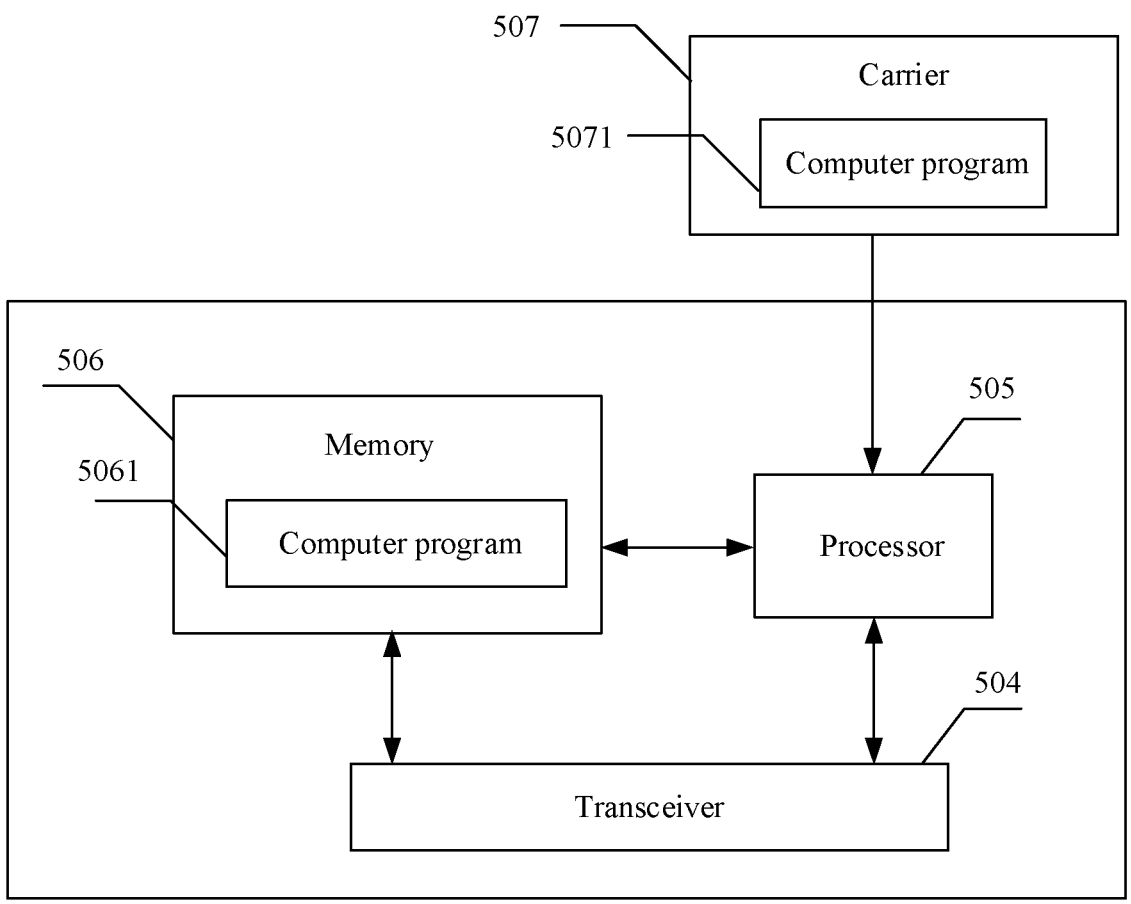

FIG. 5B is another possible schematic structural diagram of the communications apparatus in the foregoing embodiments. As shown in FIG. 5B, the communications apparatus includes a transceiver 504 and a processor 505. For example, the processor 505 may be a general-purpose microprocessor, a data processing circuit, an application specific integrated circuit (application specific integrated circuit, ASIC), or a field-programmable gate array (field-programmable gate arrays, FPGA) circuit. The communications apparatus may further include a memory 506. For example, the memory is a random access memory (random access memory, RAM). The memory is configured to be coupled to the processor 505, and stores a computer program 5061 that is necessary for the communications apparatus.

In addition, the communication method in the foregoing embodiment further provides a carrier 507. The carrier stores a computer program 5071 of the communications apparatus, and can load the computer program 5071 into the processor 505. The carrier may be an optical signal, an electrical signal, an electromagnetic signal, or a computer-readable storage medium (for example, a hard disk).

When the computer program 5061 or the computer program 5071 is run on a computer (for example, the processor 505), the computer can be enabled to perform the foregoing methods.

For example, in an embodiment, the processor 505 is configured to perform another operation or function of a mobility management network element. The transceiver 504 is configured to implement communication between the mobility management network element and a terminal device/a data management network element of a private network/a network slice selection function network element/a network database in a public network/a network repository function network element of the public network/ an authentication service network element of the private network.

In another embodiment, the processor 505 is configured to perform another operation or function of a mobility management network element. The transceiver 504 is configured to implement communication between the mobility management network element and a terminal device/a data management network element of a private network/a data management network element of a public network/a network slice selection function network element/a network database in the public network/a network repository function network element of the public network/an authentication service network element of the private network/an authentication service network element of the public network.

In another embodiment, the processor 505 is configured to perform another operation or function of a terminal device. The transceiver 504 is configured to implement communication between the terminal device and a mobility management network element.

The controller/processor configured to perform the foregoing communications apparatus in this application may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

Method or algorithm steps described in combination with the content disclosed in this application may be implemented by hardware, or may be implemented by a processor executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information to the storage medium. Certainly, the storage medium may alternatively be a component of the processor. The processor and the storage medium may be located in an ASIC. In addition, the ASIC may be located in the mobility management network element. Certainly, the processor and the storage medium may alternatively exist in the mobility management network element as discrete components.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A communication method, comprising:
receiving, by a mobility management network element, first information from a terminal device;
obtaining, by the mobility management network element, a user equipment context of the terminal device in a public network based on the first information, and a user equipment context of the terminal device in a private network also based on the first information; and
using, by the mobility management network element, the user equipment context of the terminal device in the public network and the user equipment context of the terminal device in the private network to implement access of the terminal device to both the public network and to the private network.

2. The method according to claim 1, wherein
the first information comprises a globally unique temporary identity (GUTI) of the terminal device and private-network information comprising one or more of: a subscription permanent identifier (SUPI) of the terminal device in the private network, type information of the private network, and indication information of the private network that indicates a network slice, for the private network, that the terminal device requested to access; or
the first information comprises the GUTI of the terminal device and public-network information comprising one or more of: a SUPI of the terminal device in the public network, type information of the public network, and indication information of the public network that indicates a network slice, for the public network, that the terminal device requested to access; or
the first information comprises at least one of the SUPI of the terminal device in the public network and the SUPI of the terminal device in the private network.

3. The method according to claim 2, wherein
the first information comprises at least one of the SUPI of the terminal device in the public network and the SUPI of the terminal device in the private network, and the first information further comprises one or more of: the type information of the public network, the indication information of the public network, the type information of the private network, or the indication information of the private network.

4. The method according to claim 1, wherein obtaining, by the mobility management network element, the user equipment context of the terminal device in the public network and the user equipment context of the terminal device in the private network based on the first information comprises:
sending, by the mobility management network element, request information to a data management network element of the private network based on the first information;
receiving, by the mobility management network element, subscription data of the terminal device in the private network from the data management network element of the private network; and
creating, by the mobility management network element, the user equipment context of the terminal device in the private network based on the subscription data in the private network.

5. The method according to claim 1, wherein the first information comprises a subscription permanent identifier (SUPI) of the terminal device in the private network, and the method further comprises:

obtaining, by the mobility management network element, a data management network element of the private network based on the SUPI of the terminal device in the private network and a first correspondence between the SUPI of the terminal device in the private network and the data management network element of the private network.

6. The method according to claim 1, wherein the first information comprises a subscription permanent identifier (SUPI) of the terminal device in the private network, and the method further comprises:
obtaining, by the mobility management network element, based on the SUPI of the terminal device in the private network, a data management network element of the private network from a network slice selection function network element, a network database in the public network, or a network repository function network element of the public network.

7. The method according to claim 1, wherein the first information comprises indication information of the private network, and the method further comprises:
obtaining, by the mobility management network element, a data management network element of the private network based on the indication information of the private network and a second correspondence between the indication information of the private network and the data management network element of the private network.

8. The method according to claim 1, wherein the first information comprises indication information of the private network, and the method further comprises:
obtaining, by the mobility management network element, based on the indication information of the private network, a data management network element of the private network from a network slice selection function network element, a network database in the public network, or a network repository function network element of the public network.

9. The method according to claim 4, wherein before sending, by the mobility management network element, request information to the data management network element of the private network based on the first information, the method further comprises:
obtaining, by the mobility management network element, an authentication service network element of the private network based on the first information.

10. The method according to claim 9, further comprising:
sending, by the mobility management network element, authentication indication information to the authentication service network element of the private network, wherein the authentication indication information is used to indicate to the authentication service network element of the private network to perform extensible authentication protocol-authentication and key agreement EAP-AKA authentication on the terminal device.

11. A communications apparatus, wherein the apparatus comprises:
a memory configured to store a computer program; and
a processor coupled to the memory, wherein the computer program is configured to cause the processor to:
receive first information from a terminal device; and
obtain a user equipment context of the terminal device in a public network based on the first information, and a user equipment context of the terminal device in a private network also based on the first information, wherein use the user equipment context of the terminal device in the public network and the user equipment context of the terminal device in the private network to implement access of the terminal device to both the public network and to the private network.

12. The communications apparatus according to claim 11, wherein
the first information comprises a globally unique temporary identity (GUTI) of the terminal device and private-network information comprising one or more of: a subscription permanent identifier (SUPI) of the terminal device in the private network, type information of the private network, and indication information of the private network that indicates a network slice, for the private network, that the terminal device requested to access; or
the first information comprises the GUTI of the terminal device and public-network information comprising one or more of: a SUPI of the terminal device in the public network, type information of the public network, and indication information of the public network that is used to indicate a network slice, for the public network, that the terminal device requested to access; or
the first information comprises at least one of the SUPI of the terminal device in the public network and the SUPI of the terminal device in the private network.

13. The communications apparatus according to claim 12, wherein the first information comprises at least one of the SUPI of the terminal device in the public network and the SUPI of the terminal device in the private network,
and the first information further comprises one or more of the following information: the type information of the public network, the indication information of the public network, the type information of the private network, or the indication information of the private network.

14. The communications apparatus according to claim 11, wherein the computer program is configured to cause the processor to:
send request information to a data management network element of the private network based on the first information;
receive subscription data of the terminal device in the private network from the data management network element of the private network; and
create the user equipment context of the terminal device in the private network based on the subscription data in the private network.

15. The communications apparatus according to claim 11, wherein
the first information comprises a subscription permanent identifier (SUPI) of the terminal device in the private network, and
the computer program is further configured to cause the processor to: obtain a data management network element of the private network based on the SUPI of the terminal device in the private network and a first correspondence between the SUPI of the terminal device in the private network and the data management network element of the private network.

16. The communications apparatus according to claim 11, wherein
the first information comprises a subscription permanent identifier (SUPI) of the terminal device in the private network, and
the computer program is further configured to cause the processor to: obtain a data management network element of the private network, based on the SUPI of the terminal device in the private network, from a network slice selection function network element, a network database in the public network, or a network repository function network element of the public network.

17. The communications apparatus according to claim 11, wherein
the first information comprises indication information of the private network, and
the computer program is further configured to cause the processor to: obtain a data management network element of the private network based on the indication information of the private network and a second correspondence between the indication information of the private network and the data management network element of the private network.

18. The communications apparatus according to claim 11, wherein
the first information comprises indication information of the private network, and
the computer program is further configured to cause the processor to: obtain a data management network element of the private network, based on the indication information of the private network, from a network slice selection function network element, a network database in the public network, or a network repository function network element of the public network.

19. The communications apparatus according to claim 14, wherein
the computer program is further configured to cause the processor to obtain an authentication service network element of the private network based on the first information.

20. The communications apparatus according to claim 19, wherein
the computer program is further configured to cause the processor to send an authentication request to the authentication service network element of the private network.

* * * * *